Sept. 6, 1955 H. V. KINDSETH 2,716,852
MACHINE FOR CLOSING AND SEALING FILLED BAGS
Filed Feb. 9, 1953 18 Sheets-Sheet 1

INVENTOR.
Harold V. Kindseth
BY
Merchant & Merchant
ATTORNEYS

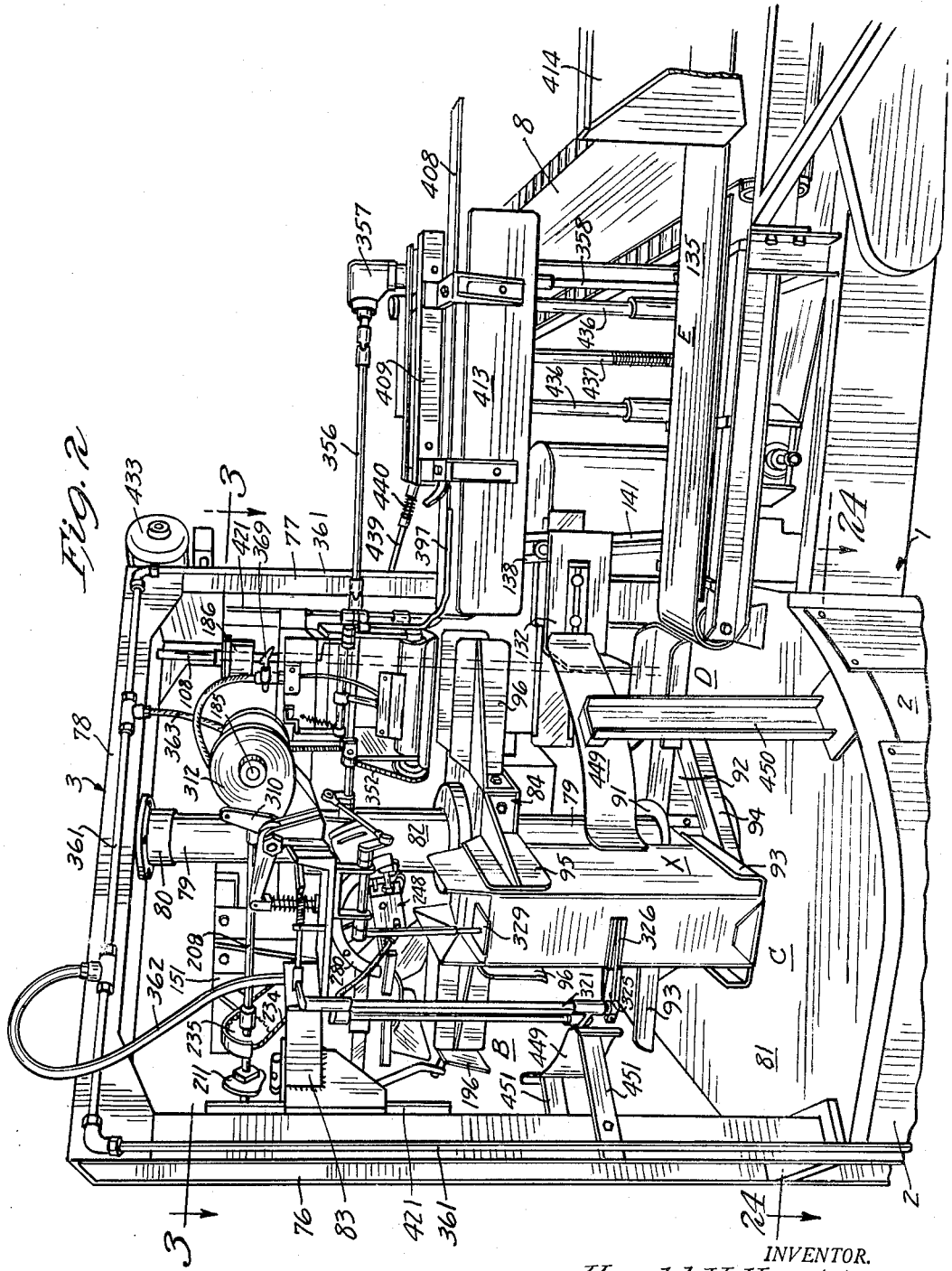

Sept. 6, 1955  H. V. KINDSETH  2,716,852
MACHINE FOR CLOSING AND SEALING FILLED BAGS
Filed Feb. 9, 1953  18 Sheets-Sheet 3
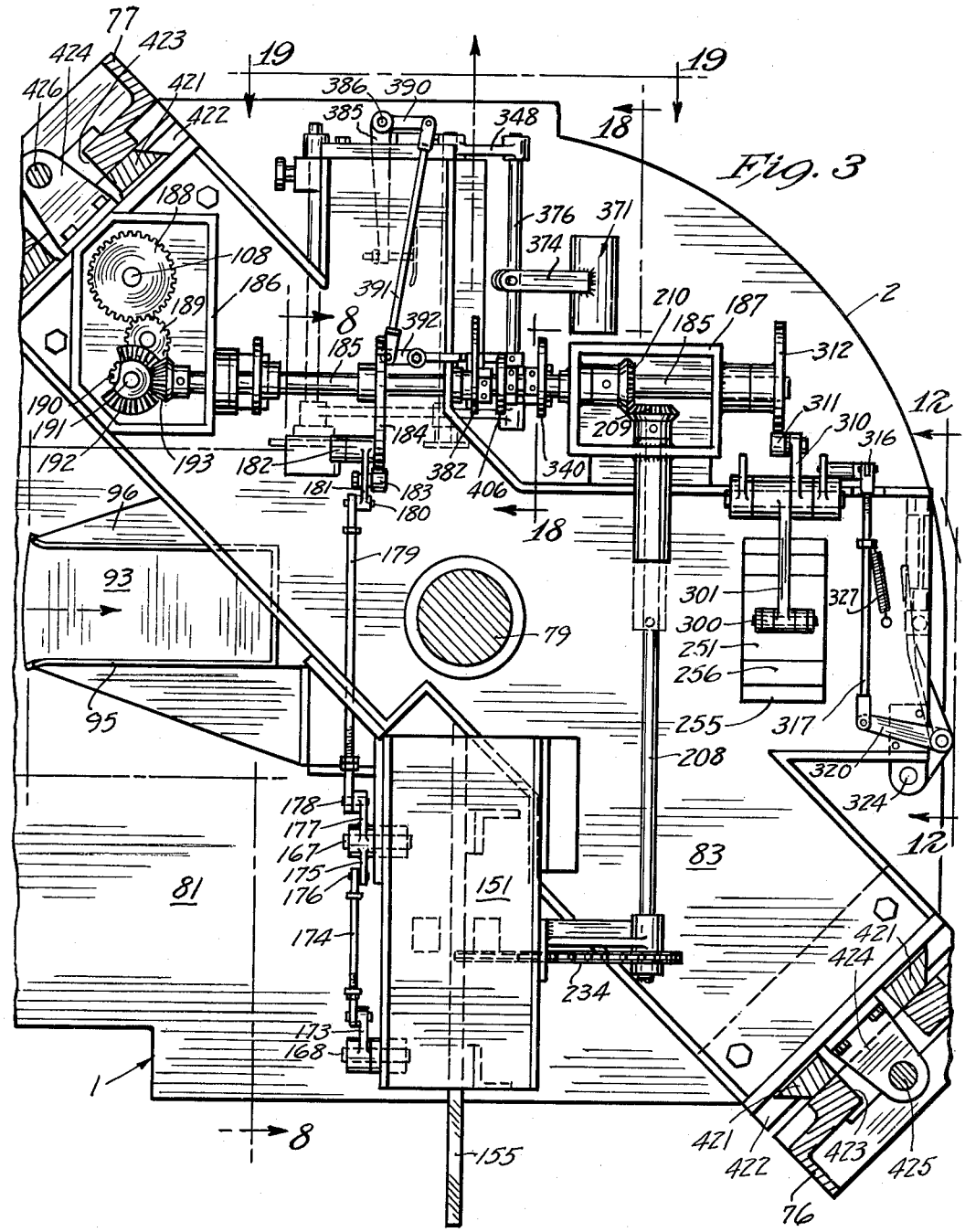
INVENTOR.
Harold V. Kindseth
BY
Merchant & Merchant
ATTORNEYS

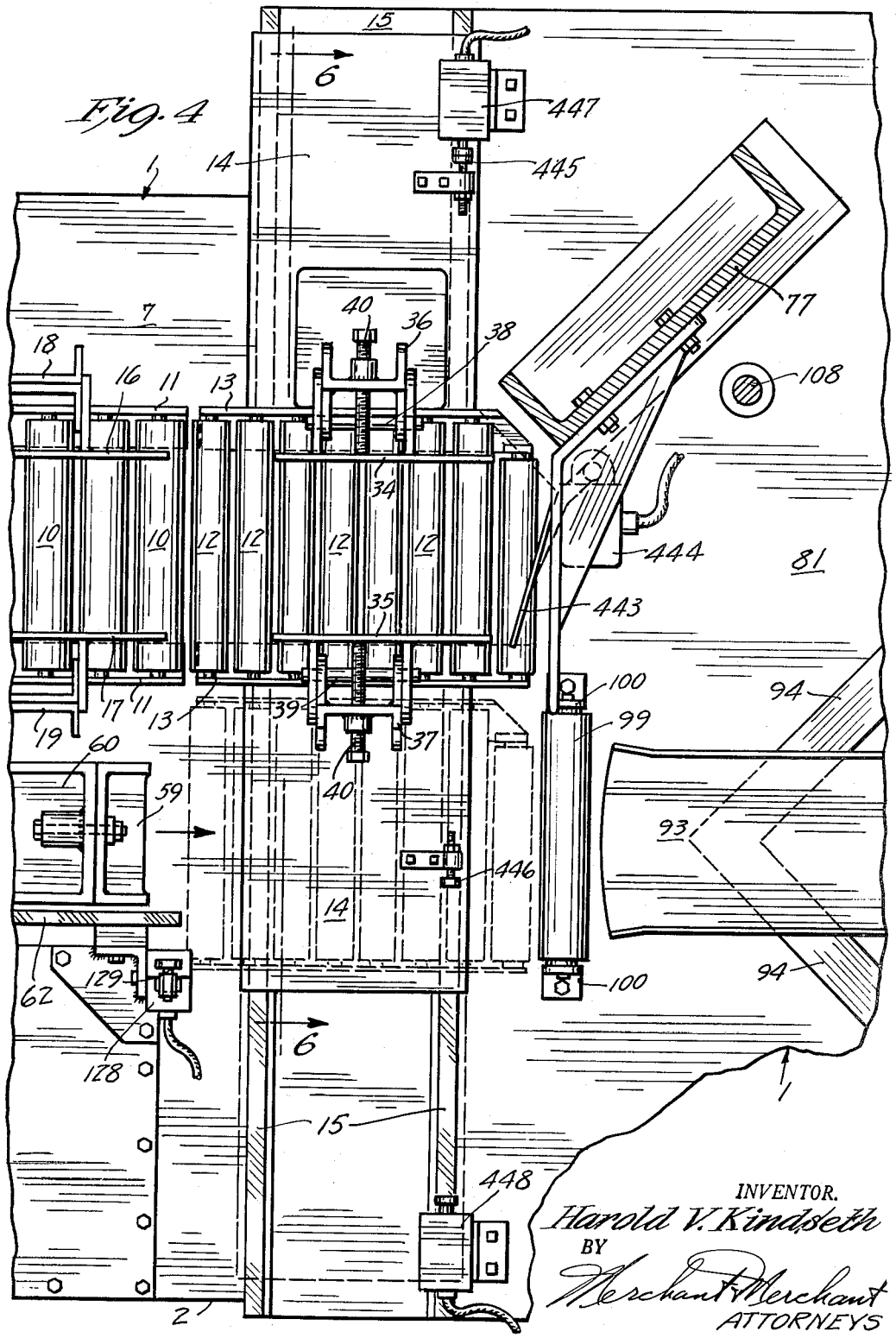

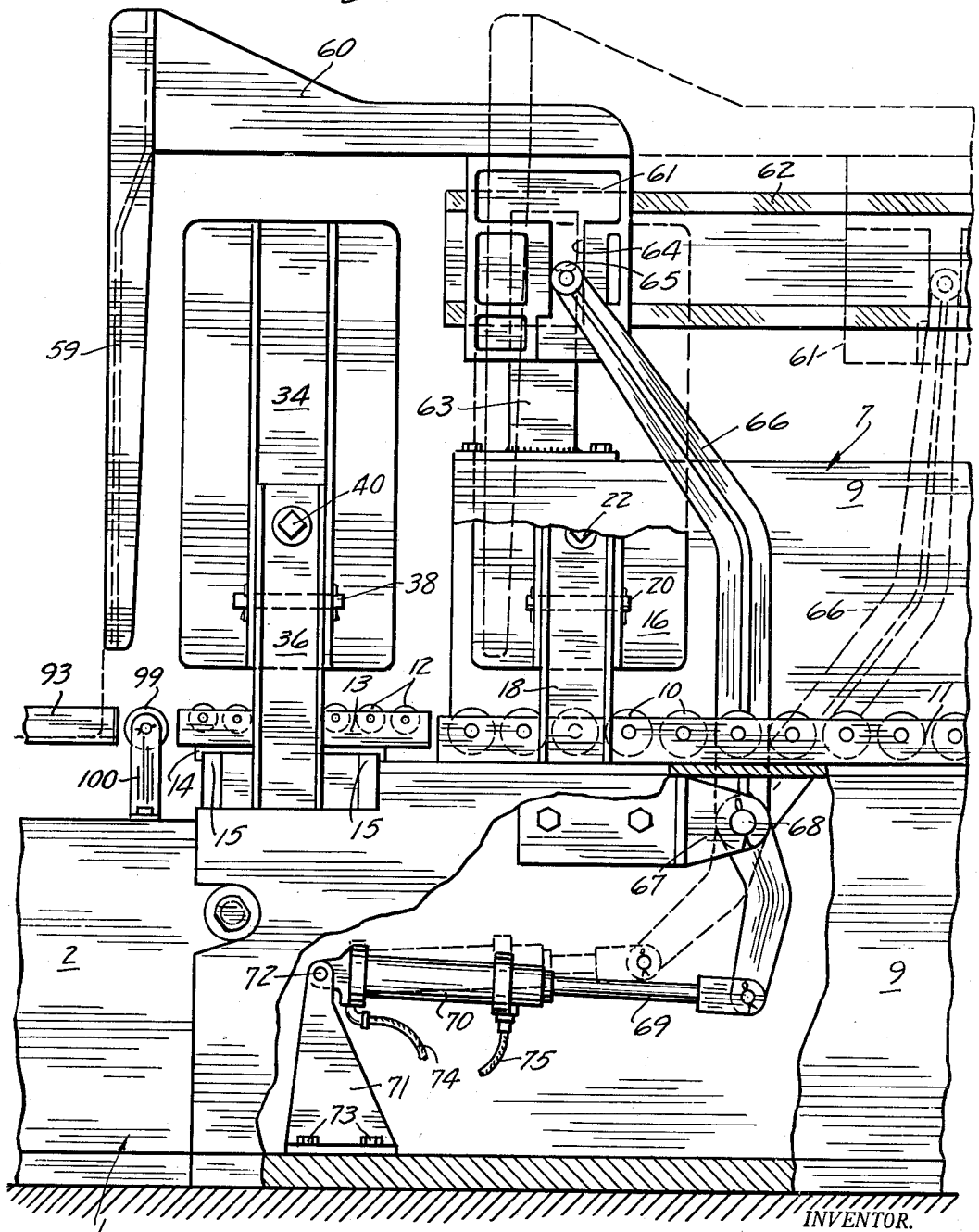

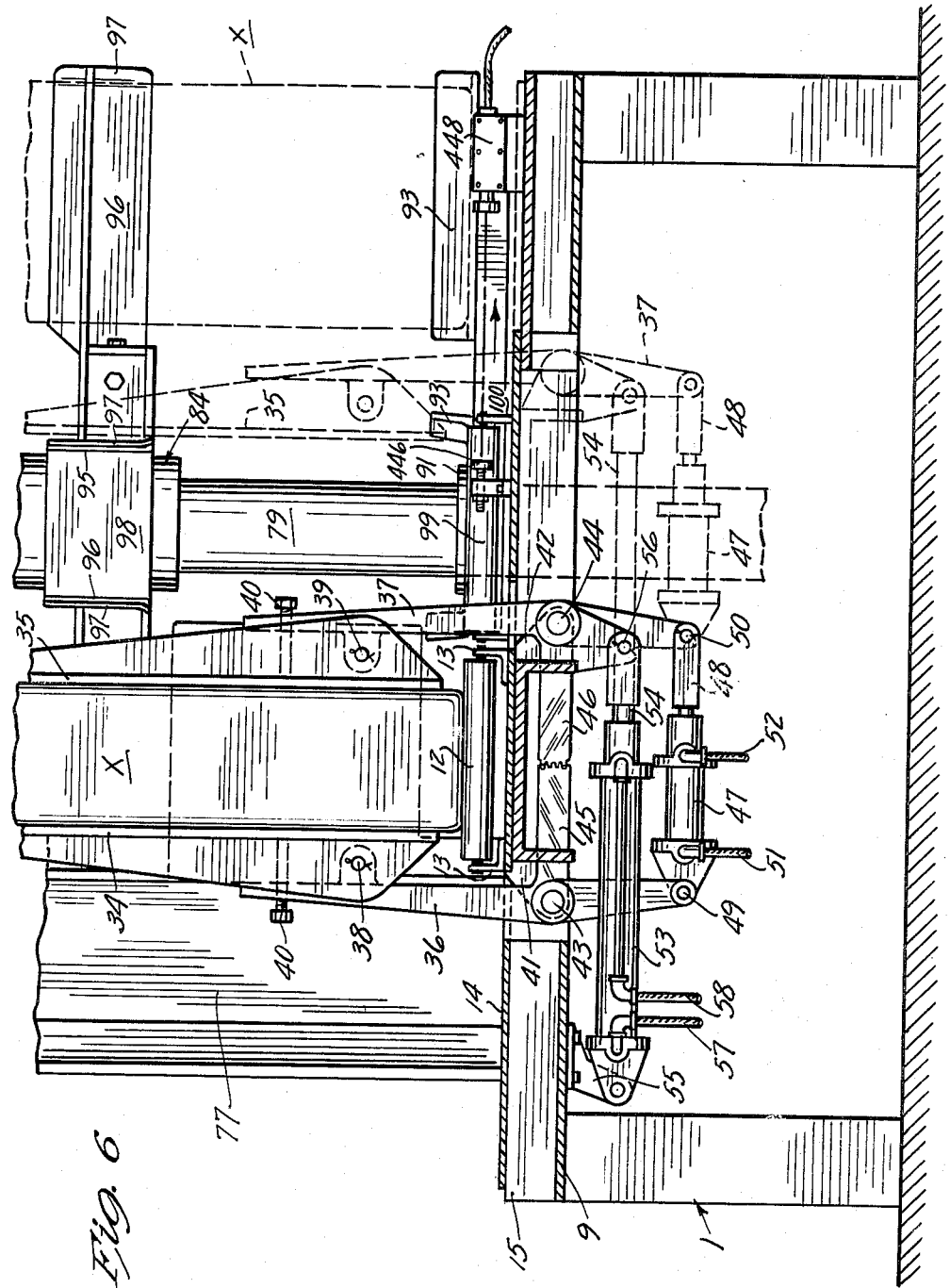

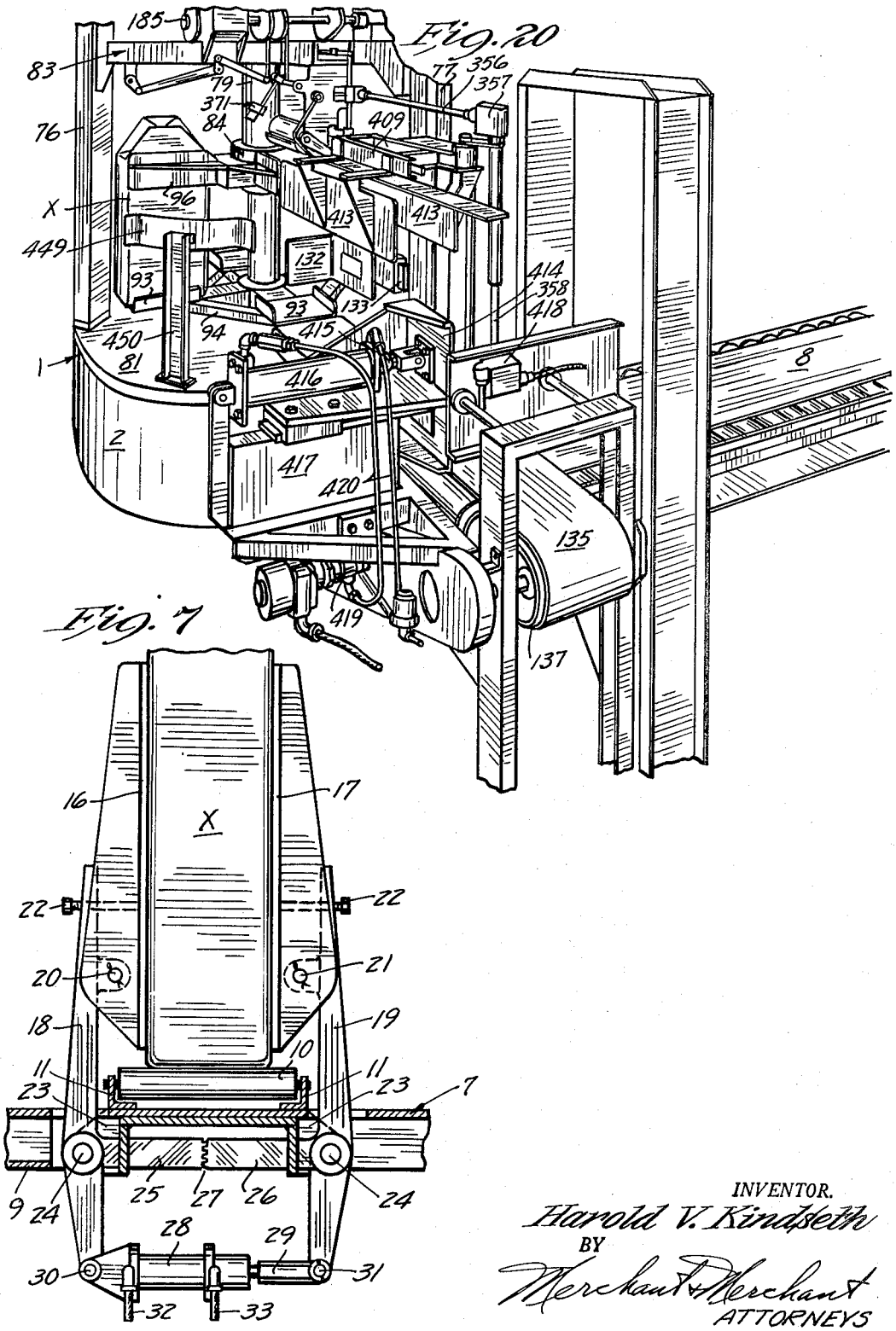

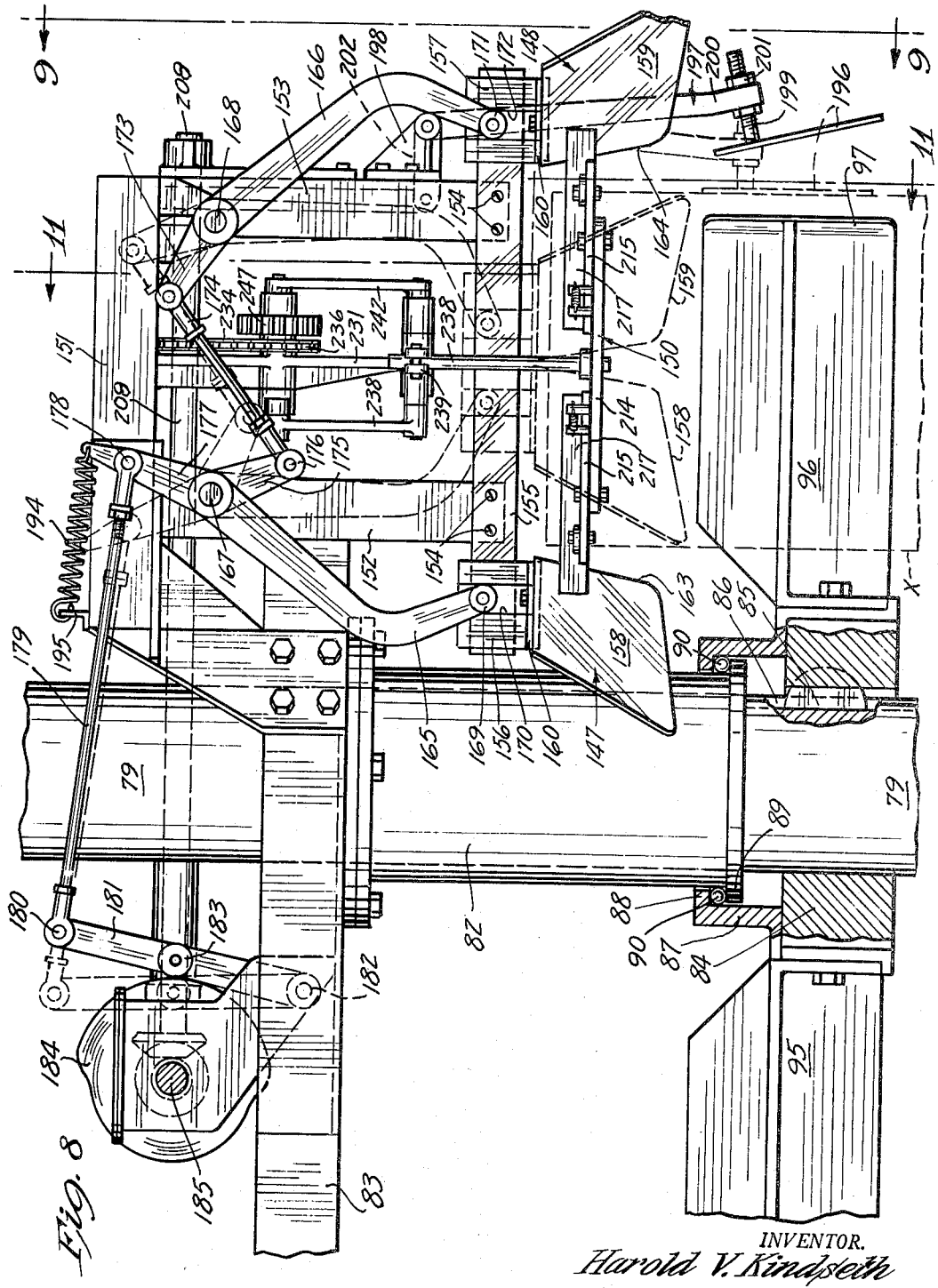

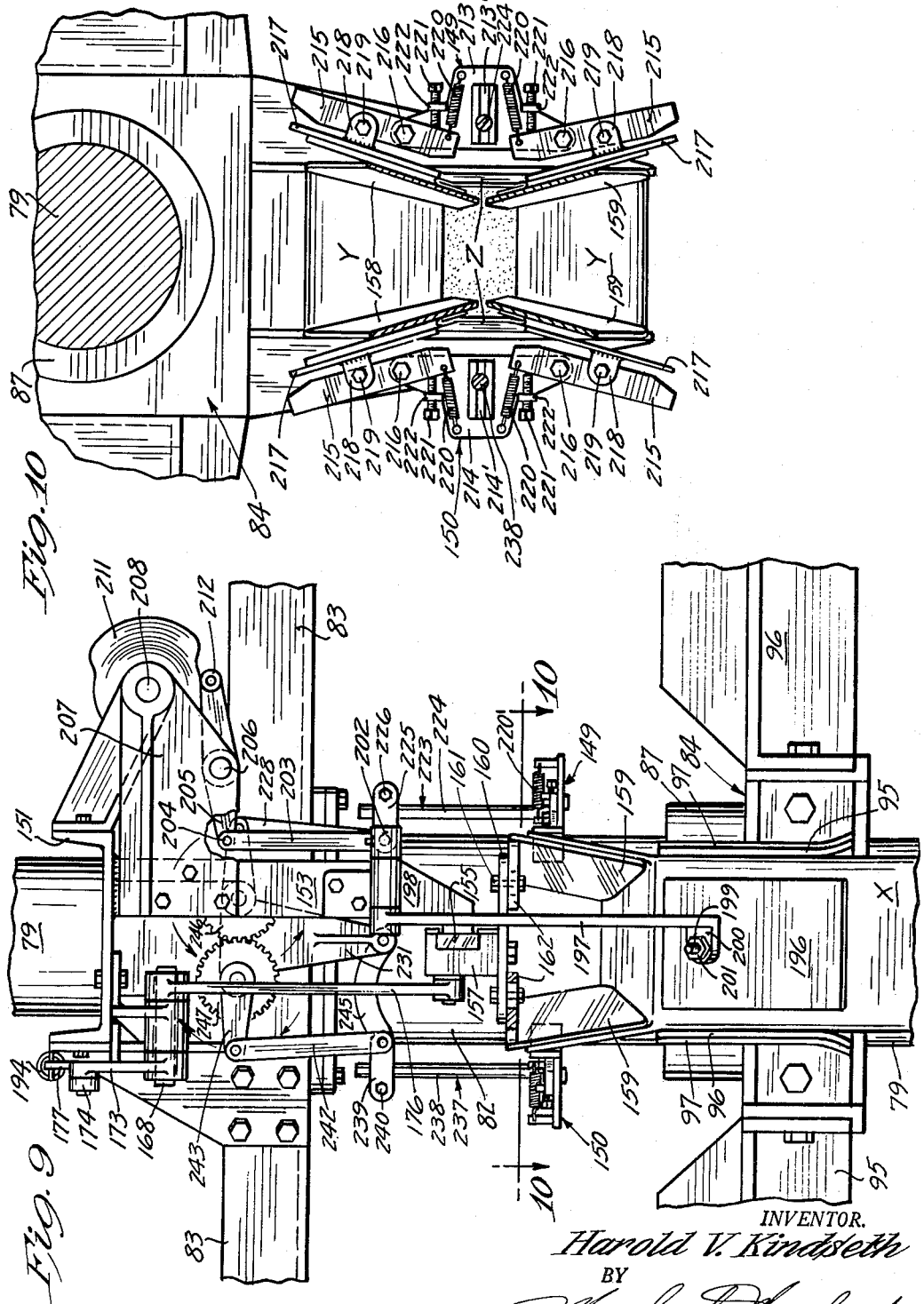

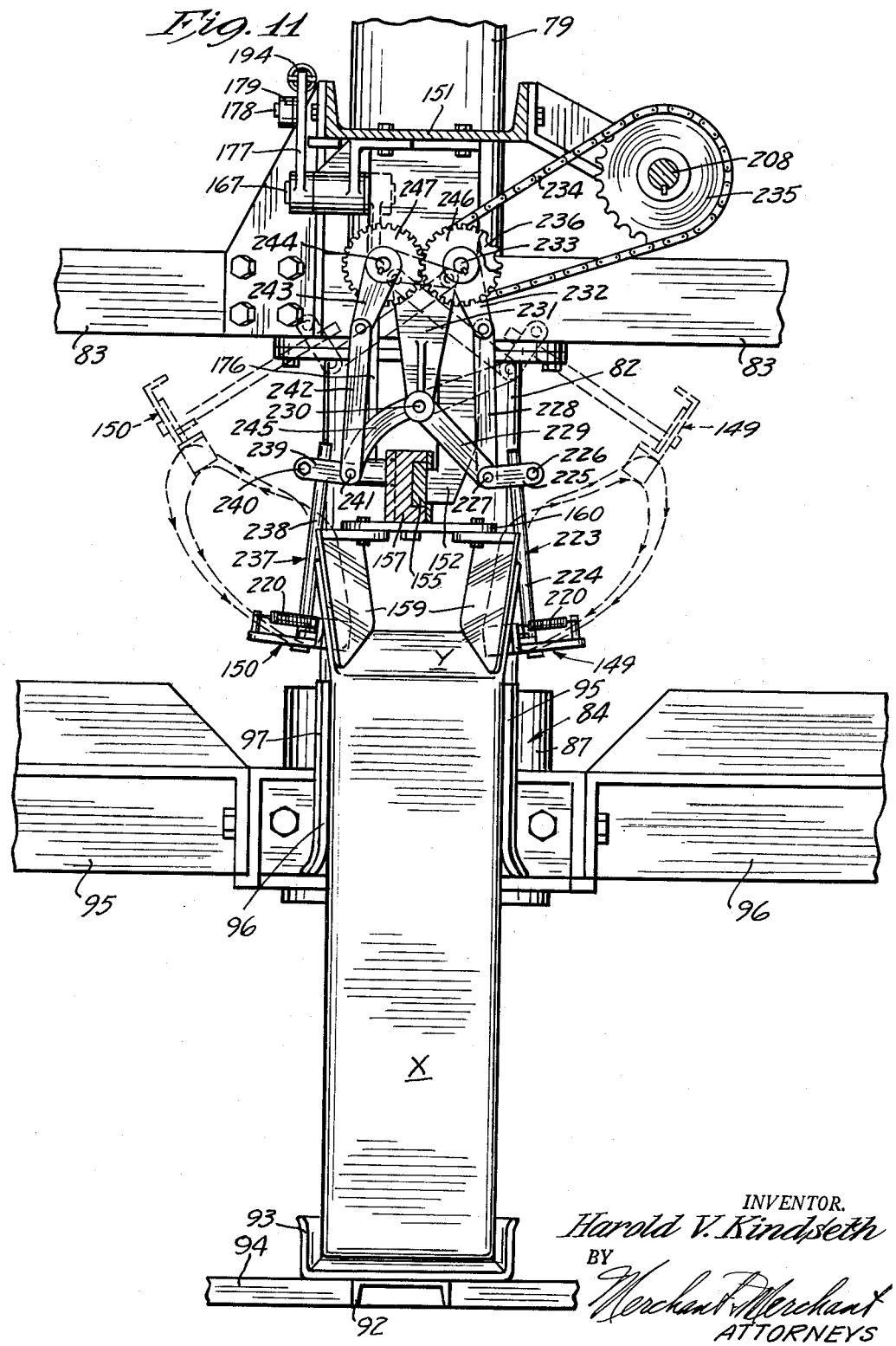

Sept. 6, 1955    H. V. KINDSETH    2,716,852
MACHINE FOR CLOSING AND SEALING FILLED BAGS
Filed Feb. 9, 1953    18 Sheets-Sheet 11
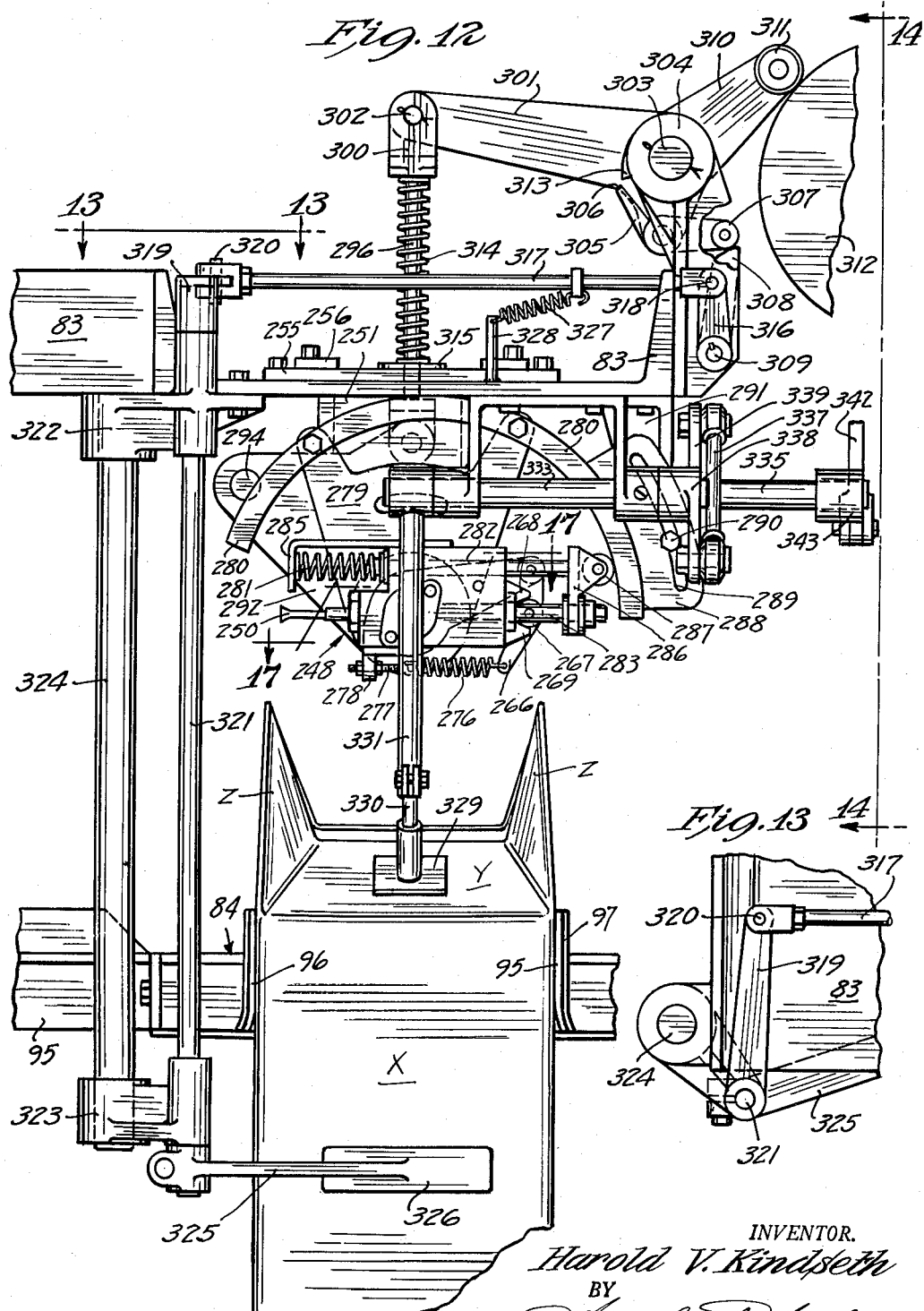
INVENTOR.
Harold V. Kindseth
BY
Merchant & Merchant
ATTORNEYS Sept. 6, 1955        H. V. KINDSETH        2,716,852
MACHINE FOR CLOSING AND SEALING FILLED BAGS
Filed Feb. 9, 1953        18 Sheets-Sheet 12
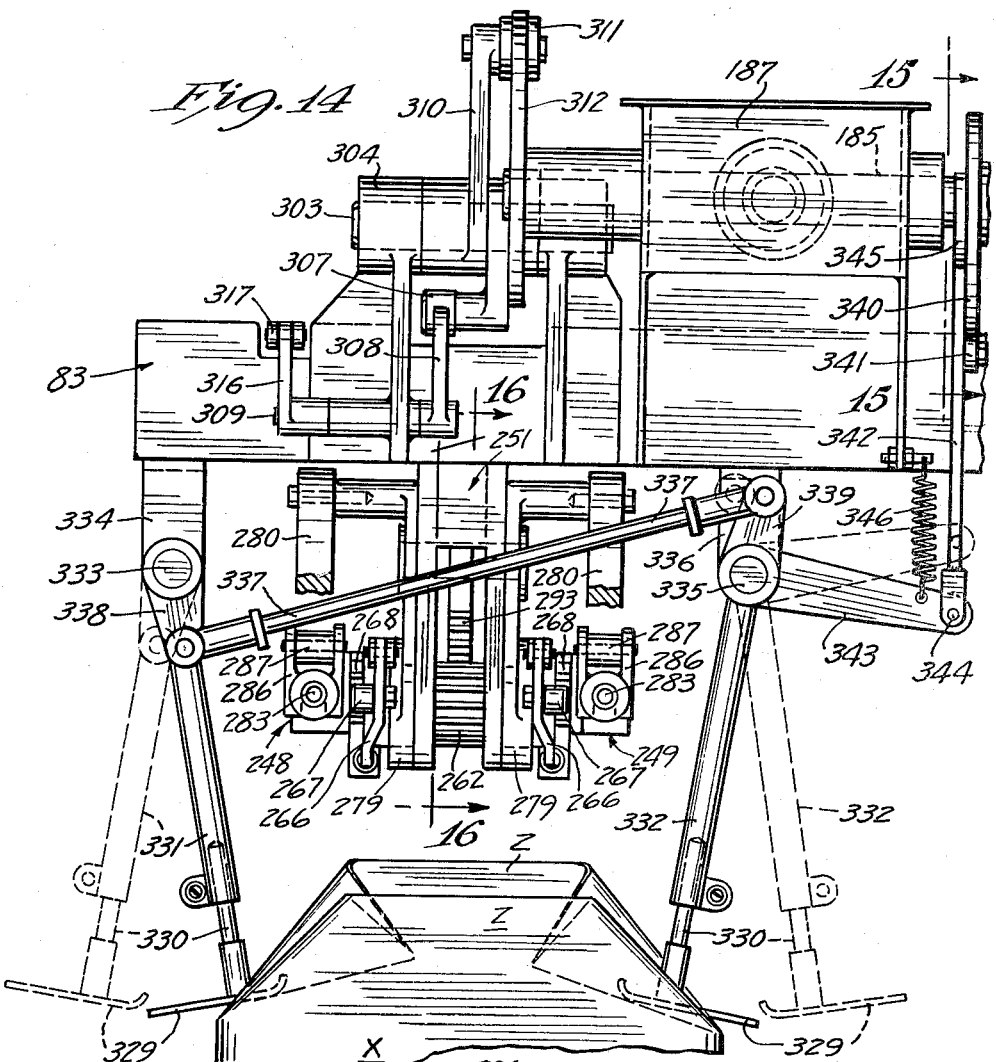
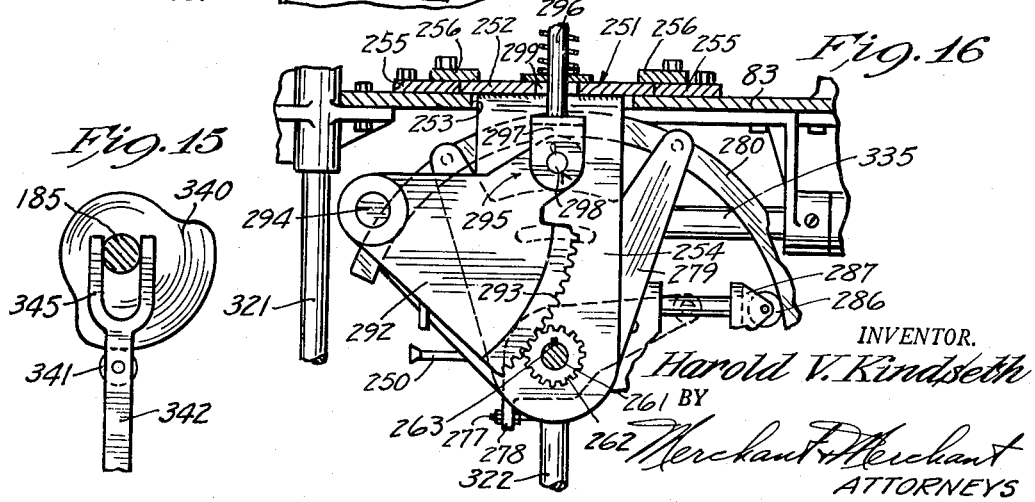

Sept. 6, 1955  H. V. KINDSETH  2,716,852
MACHINE FOR CLOSING AND SEALING FILLED BAGS
Filed Feb. 9, 1953  18 Sheets-Sheet 13
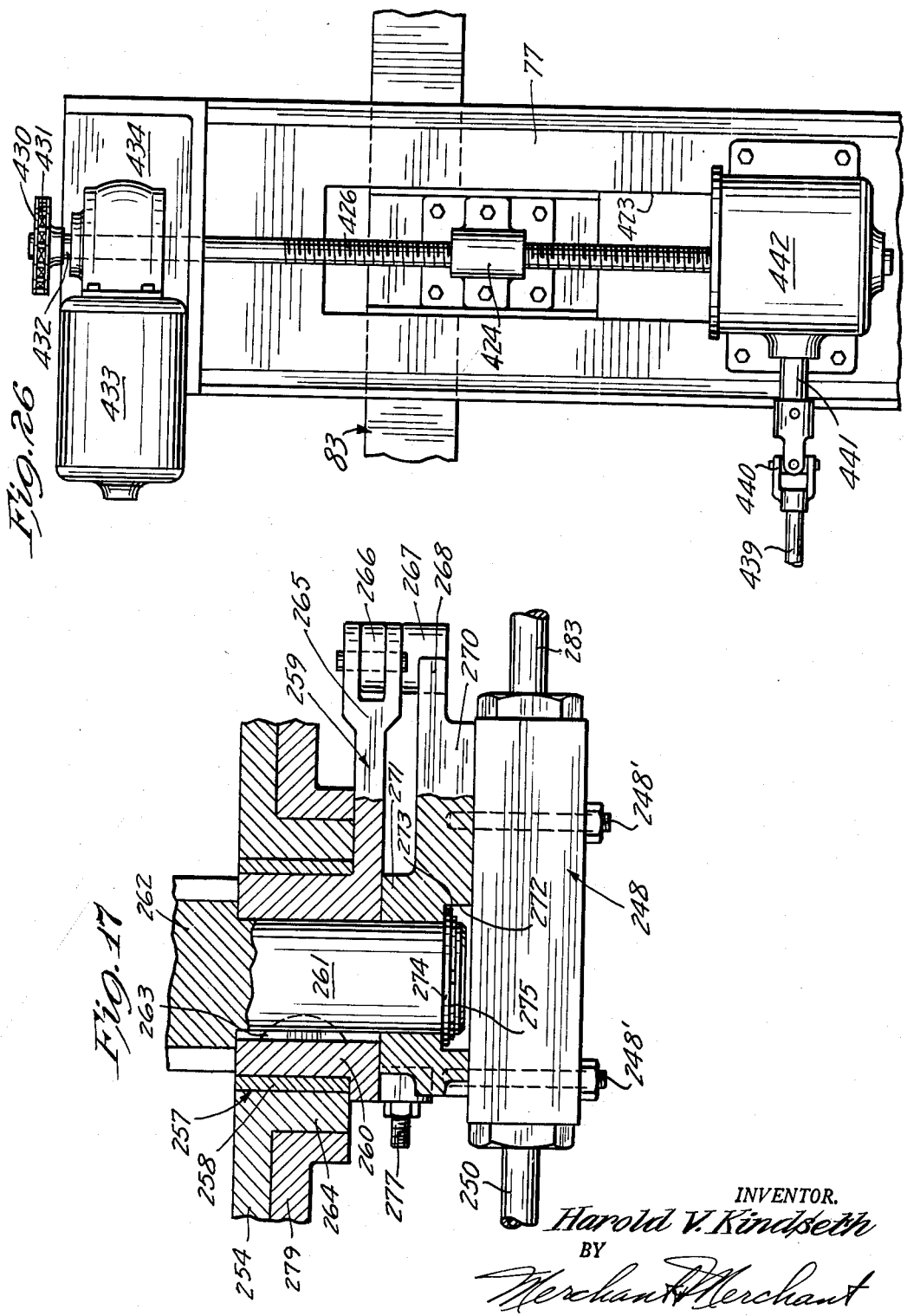
INVENTOR.
Harold V. Kindseth
BY
Merchant & Merchant
ATTORNEYS

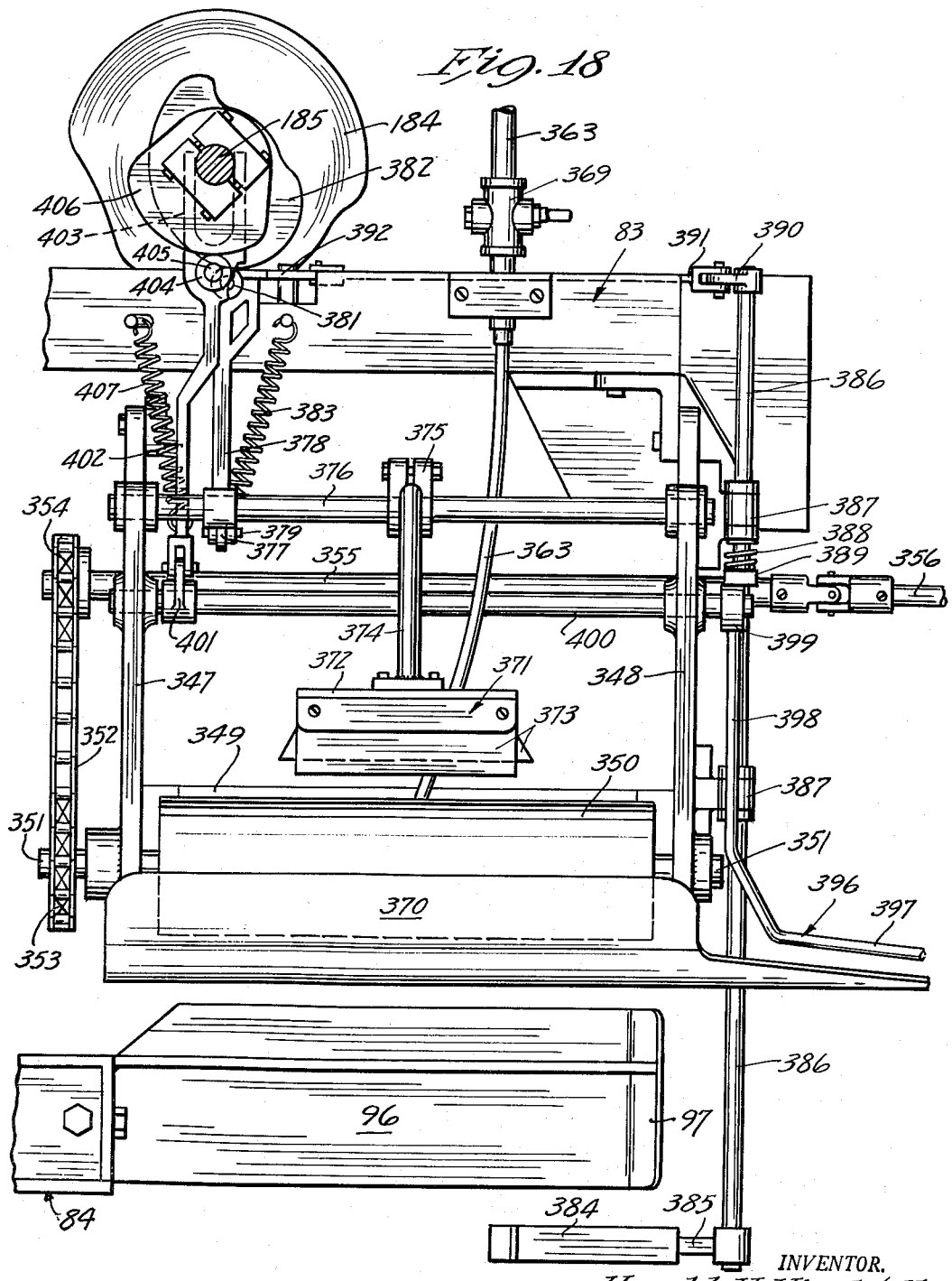

Sept. 6, 1955  H. V. KINDSETH  2,716,852
MACHINE FOR CLOSING AND SEALING FILLED BAGS
Filed Feb. 9, 1953  18 Sheets-Sheet 15

INVENTOR.
Harold V. Kindseth
BY
Merchant & Merchant
ATTORNEYS

Sept. 6, 1955        H. V. KINDSETH        2,716,852
MACHINE FOR CLOSING AND SEALING FILLED BAGS
Filed Feb. 9, 1953            18 Sheets-Sheet 16
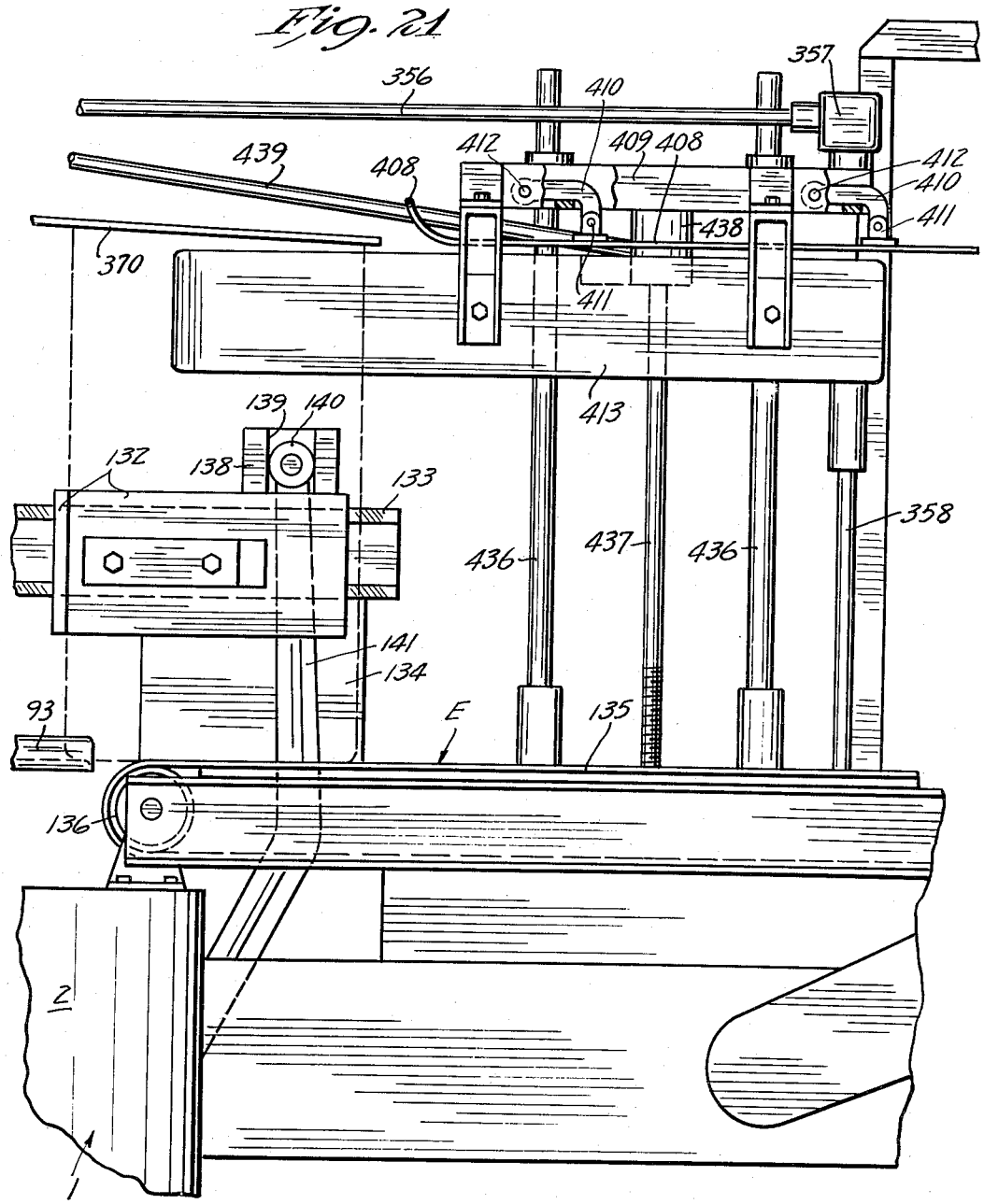

Sept. 6, 1955 H. V. KINDSETH 2,716,852
MACHINE FOR CLOSING AND SEALING FILLED BAGS
Filed Feb. 9, 1953 18 Sheets-Sheet 17

INVENTOR.
Harold V. Kindseth
BY
Merchant & Merchant
ATTORNEYS

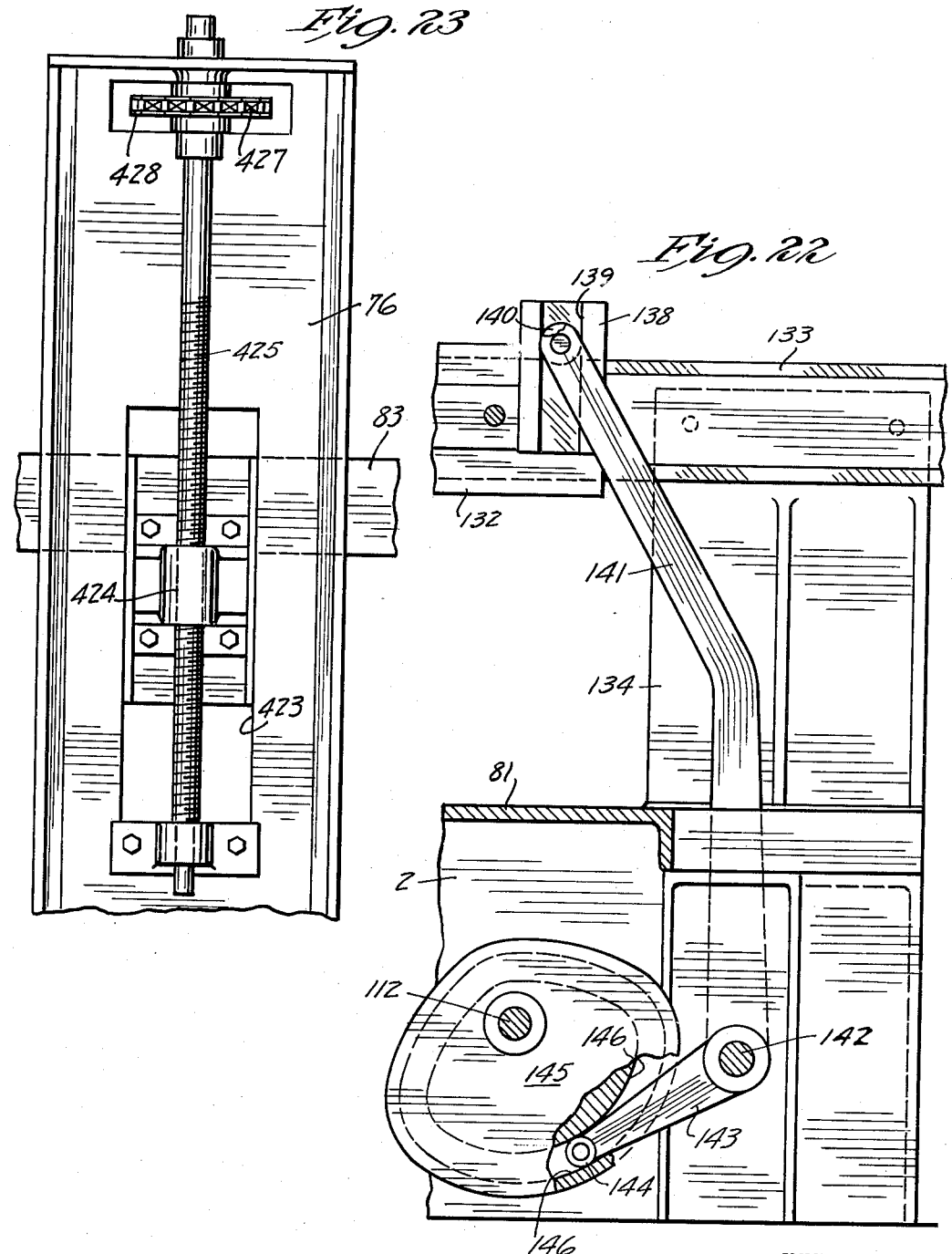

United States Patent Office 2,716,852
Patented Sept. 6, 1955

2,716,852

MACHINE FOR CLOSING AND SEALING FILLED BAGS

Harold V. Kindseth, Minneapolis, Minn., assignor to Bemis Bro. Bag Co., Minneapolis, Minn., a corporation of Missouri Application February 9, 1953, Serial No. 335,818

41 Claims. (Cl. 53—148)

My invention relates generally to bag closing machines, and more particularly to machines for automatically closing and sealing filled bags made from paper or other like flexible material.

An important object of my invention is the provision of a bag closing and sealing machine in which filled bags are supported in an upright position whereby to avoid spilling of the contents during the closing and sealing operations.

Another important object of my invention is the provision of a bag closing and sealing machine which is quickly and easily adjustable to accommodate bags of different lengths or heights.

Another object of my invention is the provision of a closing and sealing machine having novel means for supporting the bag closing and sealing mechanism, said supporting means being adjustably movable relative to the bags to be closed and sealed and mechanism for moving the supporting means.

Another object of my invention is the provision of novel bag closure forming mechanism for intucking the top portions of the opposite side walls of a bag and for forming the top portions of the front and rear walls of the bag above the fill therein into closure flaps adapted to overlie the intucked portions.

Still another object of my invention is the provision of a closure forming mechanism set forth which is capable of forming a closure for the top of the bag without regard to the relative level of the contents of the bag.

Another object of my invention is the provision of a machine of the type described having novel means for transporting filled bags to the several closing and sealing mechanisms and for novel means for squaring the upper portion of the filled bag and feeding the squared bag to the transporting means.

A still further object of my invention is the provision of novel pasting and sealing mechanisms for the bag closure, whereby to prevent leakage of the contents when the contents are in the nature of finely divided granular or powdered material.

Another object of my invention is the provision of novel control means for a bag closure pasting mechanism which will prevent liquid adhesive or paste from being dispensed or coming in contact with working parts of the machine in the absence of a bag to be sealed.

Another object of my invention is the provision of a machine as set forth which is highly efficient in operation, and which is rugged in construction and durable in use.

The above, and still further highly important objects and advantages of my invention will become apparent from the following detailed specification, appended claims and attached drawings.

Referring to the drawings, which illustrate the invention, and in which like reference characters indicate like parts throughout the several views:

Fig. 2 is a fragmentary view in perspective as seen from the right to the left of Fig. 1 on an enlarged scale;

Fig. 3 is an enlarged fragmentary view partly in plan and partly in horizontal section, taken substantially on the line 3—3 of Fig. 2;

Fig. 4 is an enlarged fragmentary view in plan of the bag feeding mechanism of my invention, some parts being broken away and some parts shown in section;

Fig. 5 is an enlarged fragmentary view in side elevation as seen from the line 5—5 of Fig. 1, some parts being broken away and some parts shown in section;

Fig. 6 is a transverse section taken substantially on the line 6—6 of Fig. 4, some parts being broken away;

Figure 1:
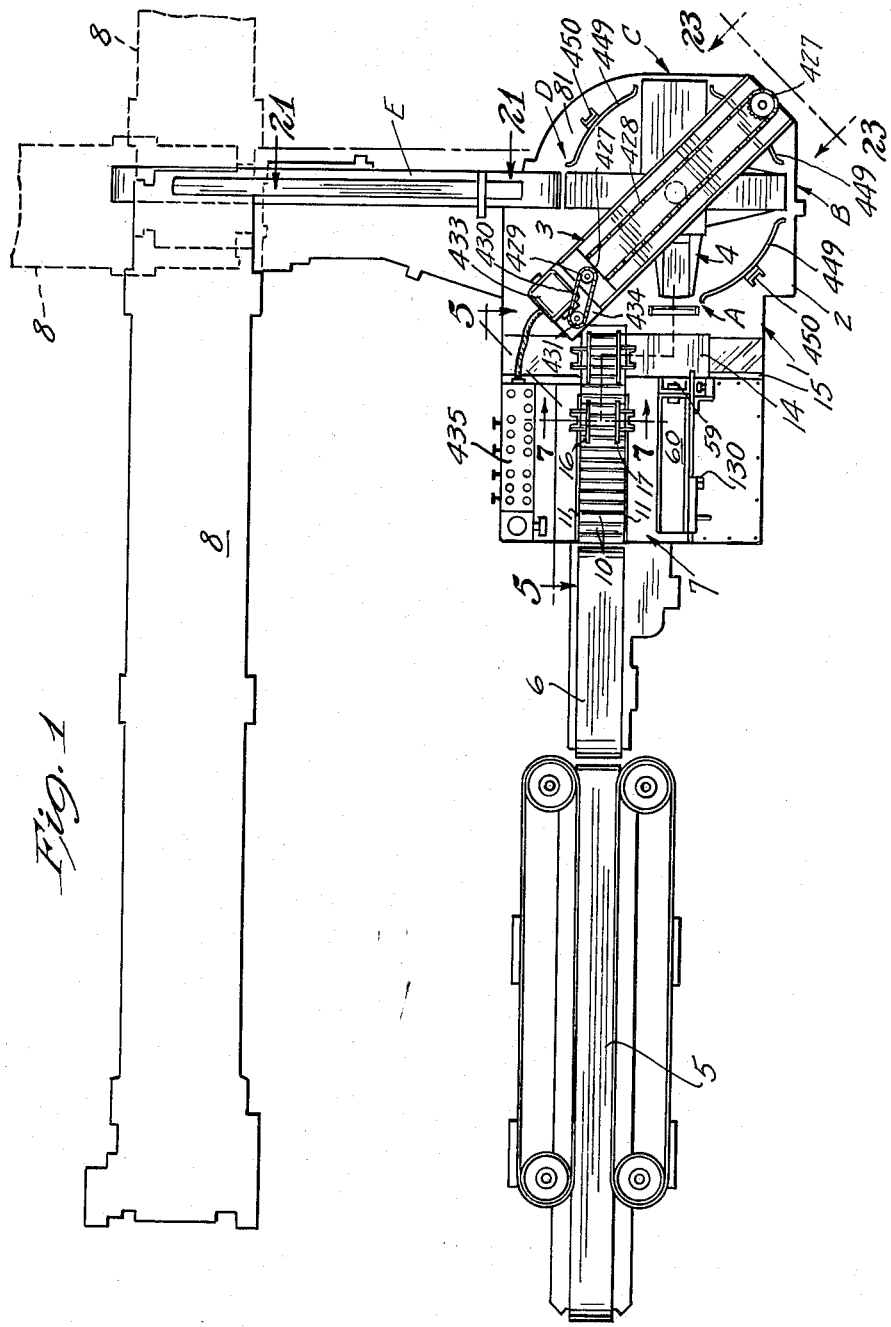
Fig. 1 is a diagrammatic view in top plan of a bag closing and sealing machine built in accordance with my invention.
Figure 19:
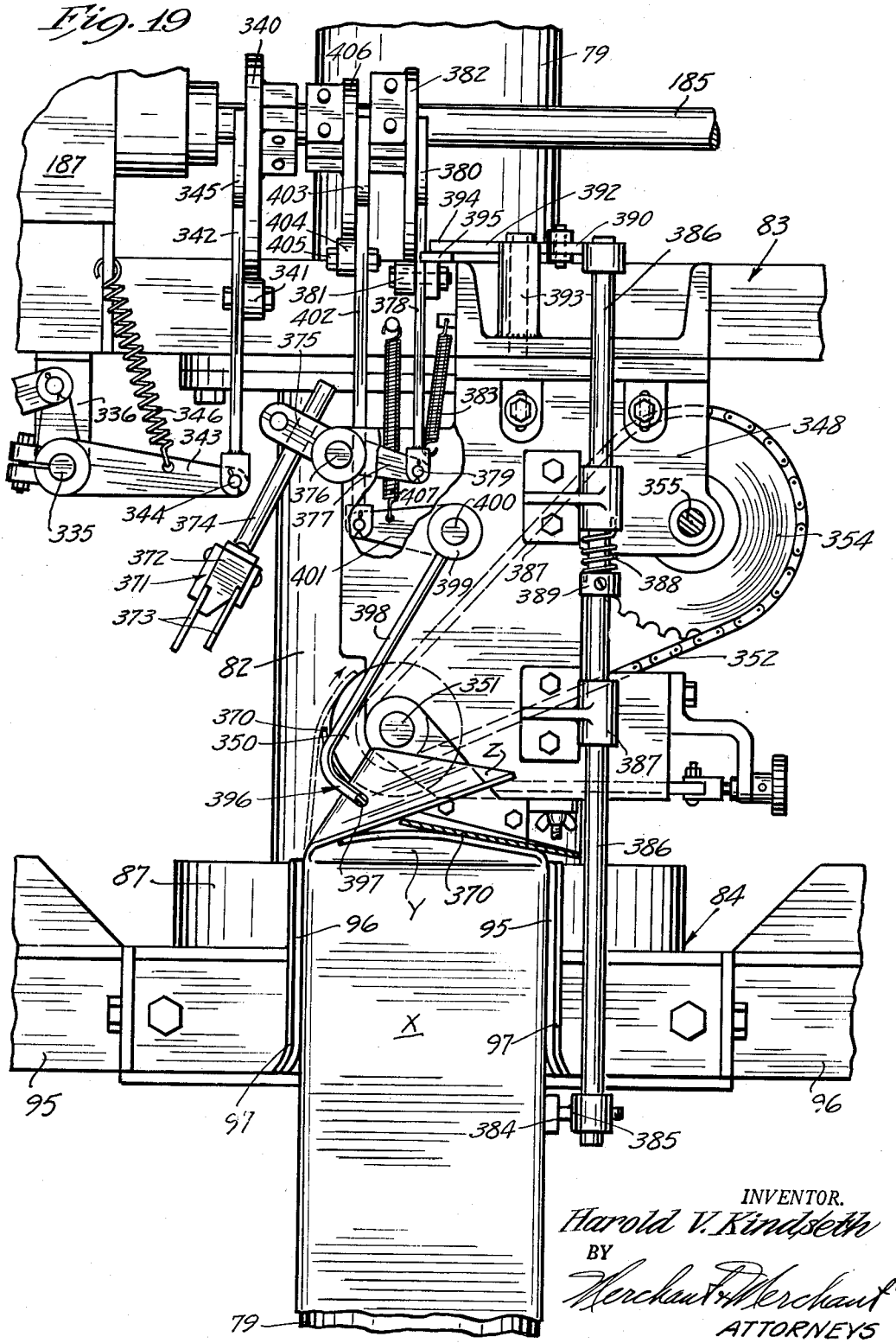
Figure 24:
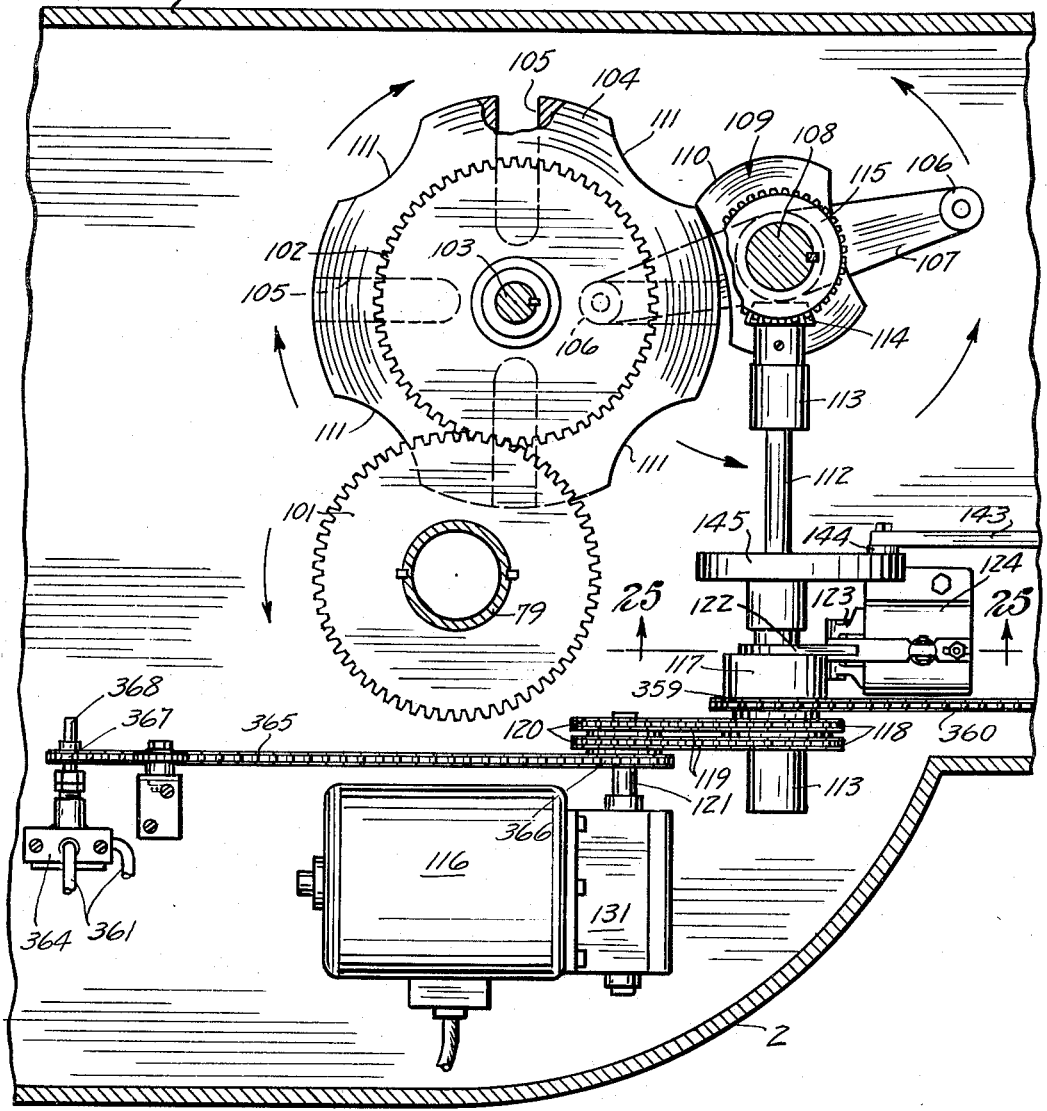
Figure 25:
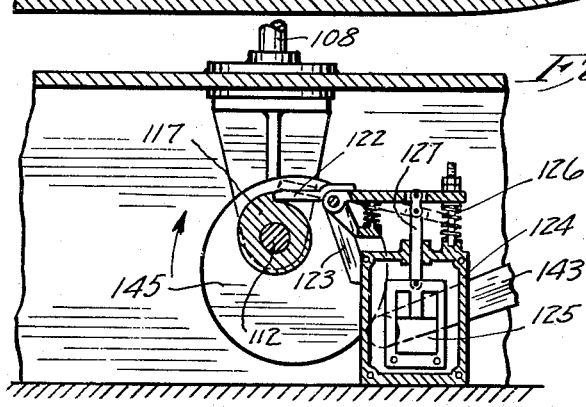

Fig. 7, sheet 14, is an enlarged fragmentary view partly in elevation and partly in section taken substantially on the line 7—7 of Fig. 1;

Fig. 8 is an enlarged fragmentary view in elevation of the bag top closure forming mechanism of my invention as seen from the line 8—8 of Fig. 3, some parts being broken away and some parts being shown in section;

Fig. 9 is a view in side elevation as seen from the line 9—9 of Fig. 8, some parts being broken away;

Fig. 10 is a fragmentary horizontal section taken substantially on the line 10—10 of Fig. 9;

Fig. 11 is a vertical section taken substantially on the line 11—11 of Fig. 8 and showing a different position of some of the parts;

Fig. 12 is an enlarged fragmentary view in elevation as seen from the line 12—12 of Fig. 3;

Fig. 13 is a fragmentary detail in top plan as seen from the line 13—13 of Fig. 12;

Fig. 14 is a fragmentary side elevational view as seen from the line 14—14 of Fig. 12, some parts being broken away and some parts being shown in section;

Fig. 15 is a fragmentary detail taken on the line 15—15 of Fig. 14;

Fig. 16 is a fragmentary view in cross section taken substantially on the line 16—16 of Fig. 14;

Fig. 17 is an enlarged fragmentary section taken substantially on the line 17—17 of Fig. 12;

Fig. 18 is an enlarged fragmentary view in elevation and vertical section taken substantially on the line 18—18 of Fig. 3;

Fig. 19 is an enlarged fragmentary view in elevation and vertical section taken substantially on the line 19—19 of Fig. 3, some parts being broken away;

Fig. 20 is a fragmentary view in perspective of the closed and pasted bag delivering mechanism of my invention;

Fig. 21 is an enlarged fragmentary view in side elevation as seen from the line 21—21 of Fig. 1;

Fig. 22 is a fragmentary detail of a portion of Fig. 21 showing a different position of some of the parts, some parts being broken away and some parts being shown in section;

Fig. 23 is an enlarged fragmentary detail in side elevation as seen from the line 23—23 of Fig. 1;

Fig. 24 is an enlarged view partly in plan and partly in horizontal section taken substantially on the line 24—24 of Fig. 2;

Fig. 25 is a fragmentary detail in section taken on the line 25—25 of Fig. 24; and Fig. 26 is a fragmentary detail in side elevation of the platform elevating mechanism of my invention as seen from the side of the machine opposite that of Fig. 23.

In the preferred embodiment of the invention illustrated, a supporting frame structure is indicated in its entirety by the reference character 1 and comprises a base 2 and an inverted generally U-shaped member 3. The bag closing and sealing machine of my invention incorporates a bag transporting device 4 which receives filled bags at a receiving station indicated at A and transfers the same to successive operating stations wherein the bag tops are formed into closures, treated with adhesive, and sealed. A filled bag is first transported from the receiving station A to the closure forming station, indicated at B, wherein the top portions of the opposite side walls of the bag are intucked and the front and rear wall top portions of the bag are formed into closure flaps adapted to overlie the intucked portions. From thence, the bag is delivered to a first pasting station C where paste or other suitable liquid adhesive is applied to the intucked portions of the bag, after which the bag is transported by the supporting means 4 to a second pasting and sealing station D, from whence the bag is transferred to a delivery conveyor E. The filled bags are delivered to the machine from a suitable bag filling device, not shown, by conventional endless belt conveyor mechanisms 5 and 6. The conveyor 5 may, if desired, include suitable jogging mechanism, not shown, for shaking the bags to cause the contents thereof to settle. Such a jogging mechanism is disclosed in my prior Patent 2,458,387 of January 4, 1949, and entitled "Machine for Compacting Material Into Containers." The conveyor 6 delivers the filled bags to a receiver 7 having means thereon for forming the upper end portion of the filled bag into a rectangular form and for delivering the filled bags to the transporting means 4 in succession. A conventional endless belt conveyor 8 shown diagrammatically in Fig. 1 receives the closed and sealed bags from the delivery conveyor E for delivery of the same to a destination remote from the machine for storage or further disposal. If desired, the conveyor 8 may be provided with suitable means for drying the adhesive with which the bags are sealed. It should be noted that neither the conveyor 8 nor the above-mentioned conveyor 5 together with their respective dryer means and jogging mechanism form a part of the instant invention. Hence neither thereof are shown or described in detail.

*Bag receiving and feeding mechanism*

The bag receiver 7 comprises a base element 9 which forms a continuation of the supporting frame 1 and which is provided with a plurality of spaced conveyor rollers 10 suitably mounted on the base element 9. As shown in Figs. 1, 4 and 5, the rollers 10 are journalled in laterally spaced rails 11 and are adapted to feed bags to a second set of conveyor rollers 12 journalled in laterally spaced supporting rails 13 mounted on a carriage 14. The carriage 14 is mounted for reciprocatory sliding movements on a track 15 for movements of the rollers 12 between one extreme position wherein said rollers 12 are in register with the conveyor rollers 10, to a laterally offset position wherein said rollers 12 are in register with the bag transporting means at the receiving station A. The conveyor mechanisms 5 and 6 are continuously driven by conventional driving means not shown and feed the bags, indicated by the reference character X, on the rollers 10 between a pair of laterally spaced forming plates 16 and 17, see Figs. 1, 4, 5 and 7. With reference particularly to Fig. 7, sheet 14, it will be seen that the forming plates 16 and 17 are pivotally connected adjacent their lower ends to a pair of levers 18 and 19 by means of pivot pins or the like 20 and 21 respectively, for limiting swinging movements with respect thereto. A pair of stop screws 22 one each screw threaded through the upper end portions of the levers 18 and 19 limit swinging movements of the forming plates 16 and 17 in one direction. The forming plates may be adjusted, by means of the screws 22, so that they assume true parallel relationship when they engage the front and rear walls of the bag X. The levers 18 and 19 are pivotally mounted on suitable brackets 23 on the base element 9 by means of short shafts 24, and are provided with opposed inwardly projecting arms 25 and 26 respectively, which have intermeshing gear teeth 27 by means of which swinging movement of one of the levers in one direction is imparted to the other thereof in the opposite direction. The forming plates 16 and 17 are normally disposed at opposite sides and laterally outwardly of the path of travel of the bags X through the receiver 7. Means for imparting swinging movements to the levers 18 and 19 to brings their respective forming plates 16 and 17 into forming engagement with the adjacent walls of a bag X comprises power operated mechanism in the nature of fluid pressure cylinder 28 and a cooperating piston equipped plunger 29, the former of which is pivotally connected to the lower end of the lever 18, as indicated at 30, and the latter of which at its free end is pivotally connected to the lower end of the lever 19, as indicated at 31. Fluid under pressure is introduced selectively to opposite ends of the cylinder 28 through conduits 32 and 33 which are adapted to be connected to a suitable source of fluid under perssure, not shown. The forming plates 16 and 17 in addition to flattening the front and rear walls of the bag X, reduced the overall thickness of the bag to a predetermined extent so that the bag may be easily received by the bag transporting means 4 of the closing and sealing machine.

Immediately behind the forming plates 16 and 17 in the direction of travel of the bags, and in tandem relationship therewith is a pair of opposed plate-like members 34 and 35 similar to the forming plates 16 and 17. The plate-like members 34 and 35 are each pivotally mounted on the upper end portion of respective levers one of a pair at 36 and 37 by means of pivot pins or the like 38 and 39 respectively for swinging movements relative to their respective levers on parallel axes. Swinging movements of the plate-like members 34 and 35 are limited in one direction by stop screws 40 one each screw threaded in and extending through each of the levers 36 and 37 at its upper end portion and having its inner end engageable with its associated plate-like member. The levers 36 and 37 are pivotaly secured to brackets 41 and 42 respectively for relative swinging movements about spaced parallel axes by means of pivot pins or the like 43 and 44 respectively. Like the levers 18 and 19, the levers 36 and 37 are provided with cooperating gear tooth equipped arms 45 and 46 respectively, whereby swinging movement of one thereof in one direction will impart swinging movement to the other thereof in the opposite direction. Swinging movement is imparted to the levers 36 and 37 to move the plate-like members 34 and 35 between their inoperative positions at opposite sides of the path of travel of the bags X to their operative bag engaging positions as shown in Figs. 4 and 6 by a fluid pressure operated cylinder 47 and a cooperating piston plunger 48. The cylinder 47 is pivotally secured to the lower end of the lever 36 as indicated at 49 and the free end of the plunger 48 is likewise pivotally secured to the lower end of the lever 37 as indicated at 50. Fluid under pressure is introduced selectively to opposite ends of the cylinder 47 through fluid conduits 51 and 52 which may be assumed to be coupled to a source of fluid under pressure, not shown.

Movement is imparted to the carriage 14 to bring the bag X into register with the bag transporting means at the receiving station A by fluid pressure operated means including a cylinder 53 and a cooperating piston plunger 54 the former of which is connected to a bracket 55 anchored to the base element 9, and the latter of which has its free end connected to the lower end portion of the carriage-mounted bracket 42 as indicated at 56. With reference to Figs. 4 and 6 it will be seen that the carriage 35 may be moved by the fluid pressure means from a position wherein the bag X, between the plate-like members 34 and 35, is in register with the conveyor 6, as indicated by full lines, to a position wherein the bag X is in register with the bag transporting means as indicated by dotted lines. Fluid under pressure is introduced selectively to opposite ends of the cylinder 53 to cause movement of the carriage, through fluid conduits 57 and 58, which, like the conduits 51 and 52, may be assumed to be connected to a fluid pressure source not shown. While the bag engaging plates 34 and 35 operate in the same manner as do the forming plates 16 and 17, it is not necessary that the plates 34 and 35 exert more than a holding pressure against the adjacent front and rear walls of the bag to maintain the same in a flattened predetermined spaced relationship during the time of transfer of the bag to the bag transporting means 4 of the machine. Hence the pressure of the fluid in the cylinder 47 need not be as great as that in the cylinder 28 associated with the forming plates 16 and 17.

I provide means for transferring the bag X from the carriage to the bag transporting means at the receiving station A, when the bag is in register therewith, said means comprising a pusher plate or the like 59 movable between the plate-like members 34 and 35 and transversely of the direction of movement of the carriage 14. The pusher plate 59 depends from and is rigidly secured to one end of a horizontally disposed arm 60 which at its other end is anchored to a crosshead 61 slidably carried by a guide rail 62. The guide rail 62 is supported from the base element 9 by means of a pair of legs 63, one of which is shown, see Fig. 5. The crosshead 61 is formed to provide a vertical channel 64 which contains a roller 65 journalled to the upper end of a lever 66 that is pivotally mounted intermediate its ends to a fixed bracket 67 by means of a pivot pin or shaft 68. At its lower end, the lever 66 is pivotally connected to the outer end of a piston-equipped plunger rod 69 mounted in and carried by a fluid pressure cylinder 70 which in turn is pivotally secured to the upper end of a supporting bracket 71, as indicated at 72. As shown, the bracket 71 is suitably anchored in the base element 9 preferably by means of anchoring bolts or the like 73. Fluid under pressure is introduced selectively to opposite ends of the cylinder 70 through fluid conduits 74 and 75 whereby to cause swinging movements to be imparted to the lever 66 with resultant reciprocatory movements of the pusher plate 59 between a retracted inoperative position indicated by dotted lines in Fig. 5, and a forwardly projected bag transferred position indicated by full lines in Fig. 5.

*Bag supporting mechanism*

The inverted U-shaped member 3 comprises a pair of laterally spaced vertical legs 76 and 77 anchored at their lower ends to the base 2, and a bridge beam 78 connecting the upper ends of said legs. A vertical post or shaft 79 has its upper end journalled in a bearing 80 bolted or otherwise rigidly secured to the intermediate portion of the beam 78, and extends downwardly through the top wall 81 of the base 2. The top wall 81 provides a bearing for the lower end portion of said shaft 79. Intermediate the base 2 and the beam 78, the shaft or post 79 extends axially through a tubular sleeve 82 which is anchored to and depends from a platform structure 83 that is vertically slidably mounted on the supporting legs 76 and 77 as will hereinafter be more fully described. My novel bag supporting and transporting means 4 is in the nature of a turntable including a body portion 84 which is mounted on the shaft 79 for vertical sliding movements with respect thereto and for common rotation therewith. With reference to Fig. 8 it will be seen that the shaft 79 carries an elongated axially extending key 85 which seats in a keyway 86 in the body portion 84. The body portion is provided with a cylindrical cap 87 which is formed with a radially inwardly projecting annular flange 88 which overlies a radially outwardly projecting annular flange 89 formed at the lower end of the sleeve 82. Preferably and as shown, anti-friction bearings 90 are interposed between the flanges 88 and 89, said bearings supporting the weight of the bag supporting means 4 and the bags carried thereby. The supporting means further includes a tubular member 91 which is rigidly secured to the shaft 79 immediately above the base 2 and which is provided with a plurality, as shown four, of radially extending arms 92 each of which carries a bag receiving tray 93. The trays 93 are further supported by diagonal brace members 94 that connect the outer end portions of the arms 92. A plurality of pairs, as shown 4, of front and rear bag wall engaging plate-like arms 95 and 96 respectively project radially outwardly from the body portion 84, one each of said pairs being associated with one of the trays 93. With reference to Fig. 2 is will be seen that the arms 95 and 96 of each pair are in overlying spaced relation to the side edge portions of their respective trays 93 and are spaced apart sufficiently to snugly receive the upper end portions of the bags X. The outer ends of the members 95 and 96 are flared outwardly as at 97 whereby to guide the bags when the same are being fed thereinto by the pusher plate 59 at the receiving station A. The spacing between each plate 95 and its associated plate 96 is such that the upper portion of the front and rear walls of the bags X will be retained in flat form. With reference to Fig. 6 it will be seen that the body portion 84 is provided with a flat outer wall surface 98 between the plates 95 and 96 of each pair whereby to flatten the upper end portion of the adjacent side wall of the bag when the bag is transferred to the supporting means by the pusher plate 59. With reference to Figs. 4 and 6 inclusive it will be seen that a supporting roller 99 is journalled in a pair of bearing brackets 100 anchored to the top plate 81 of the base 2. The roller 99 is positioned radially outwardly of the tray 93 at the receiving station A and aids in the supporting of the bag X when the same is being transferred from the receiver to the bag transporting means.

Intermittent rotary movement is imparted to the post or shaft 79 to cause each bag X to be stopped momentarily at each successive station during the bag closing and sealing operations by driving means and transmission mechanism now to be described. A gear 101 is keyed or otherwise rigidly mounted on the lower end portion of the shaft 79 within the base 2 and has meshing engagement with a similar gear 102 that is keyed or otherwise rigidly secured to the shaft 103 suitably journalled in the base 2. Also rigidly secured to the shaft 103 is a Geneva wheel 104 having a plurality, as shown four, of radially extended slots 105 that are adapted to have meshing engagement with roller-like teeth 106 on opposite ends of a rotary arm 107 rigidly secured to a vertically extended shaft 108. Over-travel of the Geneva wheel 104 is prevented in the usual manner by a rotary element 109 having diametrically opposed tooth elements 110 that engage outwardly opening notches or recesses 111 in the Geneva wheel 104. A horizontal drive shaft 112 is suitably journalled in bearings 113 in the base 2 and drives the vertically extended shaft 108 through a pair of bevel gears 114 and 115 the former of which is rigidly secured to one end of the shaft 112 and the latter of which is keyed or otherwise suitably mounted on the vertically extended shaft 108. Preferably, the gear 115 is twice the diameter of its cooperating gear or pinion 114 so that a single revolution of the shaft 112 imparts a one-half revolution to the vertically extended shaft 108. There being but two rollers 106 on the Geneva wheel driving arm 107, it should be obvious that a one-half revolution of the shaft 108 will impart a one-fourth revolution to the Geneva wheel. It will also be noted that the intermeshing gears 101 and 102 are of substantially equal size. Thus a one-fourth revolution of the Geneva wheel 104 will result in a one-fourth revolution of the post or shaft 79. Thus, the several stations A, B, C and D being spaced substantialy 90° apart, each bag X carried by the transport means 4 will be moved to a successive station upon each single rotation of the drive shaft 112.

A drive motor 116 within the base 2 drives the shaft 112 through a conventional "single revolution" clutch 117 mounted on the shaft 112 in the usual manner. The clutch is provided with sprocket wheels 118 that are engaged by driving chains 119 running thereover and over other sprockets 120 fast on the output shaft 121 of the motor 116. The clutch 117 may be one of any number of suitable single revolution clutches such as are found on punch presses and similar machine tools. For the sake of brevity said clutch is indicated more or less diagrammatically, and detailed description thereof is deemed unnecessary. Mechanism for operating the clutch 117 includes a clutch lever 122 pivotally secured at its intermediate portion to a bracket 123 which extends upwardly from a housing 124 which contains a solenoid 125. The lever 122 is yielding biased toward a clutched released position by a coil compression spring interposed between one end of the lever 122 and the housing 124. A link 127 connects the lever 122 to the armature of the solenoid 125 so that, when the solenoid is energized, the lever will be moved against bias of the spring 126 to a position to operate the single revolution clutch 117. A control switch, not shown, is contained within a housing 128 rigidly mounted on the base element 9 and has a roller equipped operating lever 129 lying in the path of travel of a switch operating lug 130 mounted on the crosshead 61, see Figs. 1 and 4. The above-mentioned switch provides part of a conventional circuit in which the solenoid 125 is interposed, and is operative, when the pusher plate 59 is in its advanced bag transferred position, to energize the solenoid 125 to thereby cause engagement of the clutch 117 with a resultant movement of the bag X from the receiving station A to the intucking and closure forming station B. Obviously, with each energization of the solenoid 125 the bags in each of the trays will be advanced to a succeeding station and an empty tray 93 will move into a bag receiving position at the receiving station A. The arrangement is such, that after the pusher plate 59 reaches its full line extended position of Fig. 5, it will subsequently be retracted to its dotted line position of Fig. 5 preparatory to transferring the next succeeding bag to the transporting means 4. The switch controlling the clutch operating solenoid will be closed and the clutch will be engaged for but one revolution of the shaft 112. Preferably, the motor 116 is provided with speed reducing gears not shown but contained within a gear box 131 rigidly secured to the casing of the motor.

Power operated mechanism for removing each filled and pasted bag from its tray 93 comprises a reciprocatory pusher element 132 that is mounted and guided for reciprocatory movements on a guide rail or the like 133 supported from the frame structure as indicated at 134, see Figs. 2, 20 and 21. The pusher element 132 is movable on the guide rail 133 from a bag delivered position overlying the radially inner end of the tray 93 at the sealing and delivery station D, whereby to transfer the filled and pasted bag from the bag transport means 4 to the delivery conveyor E. Said conveyor E comprises an endless conveyor belt 135 running over spaced pulleys 136 and 137 suitably journalled in the frame structure. The pusher element 132 is provided with a crosshead 138 having a vertically extended channel 139 containing a roller element journalled to the upper end of a lever arm, see Figs. 20 and 21. The lever arm 141 is mounted for swinging movements in the base 2 about the axis of a shaft 142 to which said lever arm is rigidly secured. A second lever arm 143 is rigidly secured to the shaft 142 and at its outer end, is provided with a cam follower roller 144 which engages a cam 134 fast on the shaft 112, see Fig. 21. Preferably, and as shown, the cam 145 is provided with a channel-like track 146 in which the cam follower roller is attached to travel upon rotary movement of the shaft 112.

*Closure forming mechanism*

The intucking and closure forming mechanism now to be described is mounted on the platform 83 in overlying relation to the path of travel of the bags X and located at the station B. Said mechanism comprises a pair of opposed intucking members 147 and 148 and a cooperating pair of closure forming members 149 and 150. The intucking members and the closure forming members, together with power operated mechanisms therefor are mounted on the platform 83 by means of a framework comprising a horizontally disposed frame member 151 and a pair of laterally spaced depending legs 152 and 153 to the lower ends of which are rigidly secured, by machine screws or the like 154, a guide bar 155 that extends transversely of the path of travel of the bags X, see Figs. 3 and 8 to 11 inclusive. The intucking members 147 and 148 each comprise head elements 156 and 157 respectively having mounted thereon pairs of laterally spaced intucking blades 158 and 159 respectively. The heads 156 and 157 are provided with laterally projecting flanges 160 to which are adjustably secured, by means of nut-equipped bolts or the like 161, inturned flanges 162 formed at the upper edge portions of the intucking blades. As shown in Figs. 9 and 11, the flanges 160 are in the nature of flat plates bolted or otherwise rigidly secured to the under surfaces of their respective heads 156 and 157. Also as clearly shown in Figs. 8 to 11 inclusive the intucking plates 147 depend from their intucking head 156 in such a manner that they converge in a downward direction as well as in the direction of the opposite intucking member 148. In like manner, the intucking plates 159 depend from their cooperating head and converge downwardly and toward their opposite intucking member 147. The intucking members 147 and 148 are slidable on the guide bar 155 from inoperative positions on opposite sides of the bag X, as indicated by full lines in Fig. 8, to operative bag intucking positions indicated by dotted lines in Fig. 8 and as shown in Figs. 9 to 11 inclusive. Movement of the pairs of intucking plates 147 and 148 toward each other causes the leading edge portions 163 and 164 thereof respectively to engage the upper end portions of the side walls of the bag X and fold same into overlying relationship to the contents of the bag inwardly or intuck the same as shown in Figs. 9 to 11 inclusive.

Means for imparting simultaneous movements to the heads 156 and 157 toward and away from each other includes a pair of levers 165 and 166 respectively mounted intermediate their ends on their respective legs 152 and 153 as indicated at 167 and 168 respectively for pivotal movements about spaced parallel axes. The lower end of the lever 165 is provided with a roller 169 that rides in a vertical channel 170 in the head 156, the lower end of the lever 166 being provided with a similar roller 171 which rides in a vertically extended channel 172 in the head 157. The upper end portion 173 of the lever 166 is pivotally secured to one end of a rigid link 174 which has its other end pivotally connected to a depending arm 175 rigidly secured to the lever 166, said pivotal connection being indicated at 176. With reference to Fig. 8 it will be noted that swinging movements of the lever 165 to move its cooperating intucking member 147 in one direction will cause the rigid link 174 to impart corresponding movement to the cooperating intucking member 148 in the opposite direction. The link 174 is adjustable in length whereby to cause the fields of movement of the heads 156 and 157 on the guide bar 155 to be moved closer together or further apart so that bags of various widths may be properly intucked by the intucking members 147 and 148.

The upper end 177 of the lever 165 has a pivotal connection 178 to a reciprocatory push rod 179 that has its other end pivotally secured as indicated at 180 to the upper end of an upstanding lever 181, the lower end of which is pivotally mounted to the platform 83 as shown by dotted lines in Fig. 8 and as indicated at 182. Intermediate its ends, the lever 181 has journalled thereon a cam follower roller 183 which has operative engagement with a cam 184 rigidly secured to a horizontally disposed shaft 185. With reference to Fig. 3 it will be seen that the shaft 185 is journalled at its opposite end portions in suitable bearings in a pair of spaced gear boxes 186 and 187 rigidly mounted on the platform 83. The vertical shaft 108 extends upwardly through and is journalled in the top wall 81 of the base 2, and has its upper end portion extending upwardly through the gear box 186 wherein said upper end is mounted for rotary and longitudinal movements relative thereto. A gear 188 is secured to the upper end portion of the shaft 186 for common rotation with said shaft end for axial sliding movements thereon whereby the gear 188 is rotatable by the shaft 108 irrespective of the level of the platform 83 with respect to the base 2. The gear 188 drives the horizontally disposed shaft 185 through gearing including a pinion 189 suitably mounted intermeshing with the gear 188 and with a second pinion 190 keyed or otherwise rigidly secured to a shaft 191 suitably journalled in the gear box 186. A bevel gear 192 is also rigidly secured to the shaft 191 and has meshing engagement with a bevel gear 193 rigidly secured to the adjacent end of the shaft 185 within the gear box 186. The ratio of the gearing between the drive shaft 112 and the shaft 185 is such that a single revolution of the drive shaft 112 will cause a corresponding single revolution to be imparted to the horizontal shaft 185, this single revolution causing the intucking members 147 and 148 to travel through a single full cycle of intucking movement from their inoperative full line positions of Fig. 8 to their bag intucked positions as indicated by dotted lines therein, and back to their inoperative positions. The intucking levers 165 and 166 are yieldingly biased in the direction of intucking movement by a coil tension spring 194 secured at one end to the upper end of the lever arm 177 and at its other end to an anchoring bracket 195 secured to the horizontal frame member 151 on the platform 83.

As earlier described, when a bag X having its front and rear walls flattened by the forming plates 16 and 17 is transferred to a receiving tray 93 at the receiving station A, one side of the upper portion of the bag is flattened against the bag engaging surface 98 of the turntable body portion 84. For flattening the upper end portion of the opposite side of the bag to make the same rectangular in form prior to intucking the opposite sides thereof, a side wall engaging flattening plate 196 is provided. Means for moving the flattening plate 196 into and out of engagement with the adjacent side of the bag, when the same is moved to the intucking and closure forming station B, comprises a bell crank 197 mounted at its intermediate portion for swinging movements on a bracket 198 bolted or otherwise rigidly secured to the leg 153. The plate 196 is provided with a laterally outwardly projecting stud 199 which projects through the lower end portion of one arm 200 of the bell crank 197 and is adjustably secured thereto by clamping nuts 201. The other arm 202 of the bell crank 197 is pivotally connected at its outer end to the lower end of a link 203 which, at its upper end, is pivotally secured as indicated at 204 to one end of a lever 205 mounted intermediate its ends on a shaft 206 journalled in a bracket 207 bolted or otherwise rigidly secured to the upper end portion of the leg 153. The bracket 207 provides a bearing for one end of a horizontal shaft 208 that has its opposite end journalled in a bearing formed in the gear box 187. A bevel or miter gear 209 is pinned or otherwise rigidly secured to the end of the shaft 209 within the gear box 187 and has meshing engagement with a similar bevel or miter gear 210 rigidly secured to the shaft 185 whereby rotary movement is imparted to the shaft 208. A cam 211 is mounted for rotation on the shaft 208 and operates a cam follower roller 212 journalled on the outer end of the lever 205 and imparts rocking movements to the lever to cause swinging movements of the bell crank 197 whereby to move the plate 196 into flattening engagement with the upper end portion of the adjacent side of the bag X at the station B.

The upper end of the bag being shaped into rectangular form as above described thus presents substantially parallel straight side surfaces to the opposite pairs of intucking blades 158 and 159 so that, when the blades move inwardly toward each other, the said upper end portions of the sides of the bag X fold inwardly and downwardly to provide intucked portions Y overlying the contents of the bag and upstanding closure forming flap elements Z which are adapted to be folded inwardly and downwardly over each other and the intucked portions Y. The material from which the bags are made is normally sufficiently rigid to offer a slight resistance to the intucking blades so that when the bags are intucked, said intucked portions Y do not necessarily engage the top of the contents of the bag if the level of the contents is below that of said intucked portions. The above-mentioned resistance offered by the bag material to the intucking blades causes said bag material to engage the leading edges 163 and 164 of the blades together with the bottom edges thereto until the intucking operation is completed. Thus, the formation of a satisfactory closure is not dependent upon the height of the fill within the bag, and the bag can be effectively sealed with my novel machine even though there is a reasonable variation in the levels of filled indifferent bags.

In the intucking operation, opposite side portions of the front and rear walls of the bag X adjacent the top thereto become folded inwardly as a natural result. In order to maintain the upper end of the bag in an intucked condition during pasting and sealing of the bag, the opposite side edges of the closure forming elements must be creased, and for this purpose I provide the closure forming or creasing members 149 and 150. The closure forming or creasing members 149 and 150 comprise platelike creasing heads 213 and 214 respectively that are elongated transversely of the direction of travel of the bags X and to the opposite ends of which are pivotally mounted lever members 215. With reference to Fig. 10 it will be seen that the lever members are mounted intermediate their ends to the heads 213 and 214 by pivot bolts or the like 216. A plurality, as shown four, of creasing shoes 217 are adapted to engage the outer surface portions of the flap forming elements Z and are provided with laterally outwardly extending lugs 218 that are mounted for limited pivotal movements one each to a different one of the lever members 215 between their pivotal connections to their respective creasing heads and their outer ends by means of pivot bolts or the like 219. The lever members 215 are each yieldingly biased in one direction of pivotal movement by coil tension springs 220 each having an inner end connected to the laterally inner end of a different lever member 215 and its other end anchored to the adjacent creasing head 213 or 214. Spring imparted swinging movements of each of the lever members 215 is limited in one direction by stop screws or the like 221 having screw threaded engagement with upstanding lugs 222 on the creasing heads 213 and 214, see Fig. 10. The above arrangement permits each creasing shoe 217 to conform readily to the angle of its cooperating intucking blade 158 or 159 whereby to effectively crease the upper flap forming ends of the bags X. The closure forming or creasing head 213 is rigidly secured to the lower end of a lever indicated at its entirety by the numeral 223 and which comprises an upwardly projecting shank portion 224 rigidly held in the bifurcated end of a clamping member 225 equipped with a clamping screw or the like 226. The clamping member 226 is welded or otherwise anchored to one end of a shaft 227 to the other end of which is similarly anchored the lower end of an upper lever portion 228. A rock arm 229 has its outer end pivotally secured to the shaft 227 between the lower end of the upper lever portion 228 and the clamping member 225, and is mounted at its other end for swinging movements on a shaft 230 projecting outwardly from the lower end of a bearing bracket 231 depending from the cross member 151. The upper end of the upper lever portion 228 is pivotally connected to the outer end of a crank arm 232 that is keyed or otherwise rigidly mounted on a crank shaft 233 journalled in the bearing bracket 231. Rotation is imparted to the shaft 209 by an endless link belt 234 running over a sprocket wheel 235 fast on the shaft 209 and another sprocket wheel 236 fast on the shaft 233, see Figs. 9 and 11. The closure forming head 214 is similarly mounted for creasing movements, being rigidly secured to the lower end of a lever 237 which comprises a lower shank portion 238 adjustably locked in the bifurcated end of a clamping member 239 which is welded or otherwise secured to a fulcrum forming shaft 241. The upper lever portion 242 is welded or otherwise suitably anchored at its lower end to the shaft 241 and is pivotally connected at its upper end to a crank arm 243, which at its inner end is keyed or otherwise locked to a crank shaft 244 journalled in the bearing bracket 232 in spaced parallel relationship to the crank shaft 233. A rock arm 245 has its outer end pivotally mounted on the shaft 241 and its inner end pivotally mounted on the shaft 230 at the lower end of the bracket 232. It will be noted that the pivotal connections between the outer ends of the rock arms 229 and 245 and their respective levers 223 and 237, the pivotal connections between the upper lever portions 228 and 242 and their respective crank arms, and the pivotal connections between the inner ends of the rock arms 229 and 245 and the bracket 231 have axes parallel to the axes of the crank shafts 233 and 244, so that when the creasing movements are applied to the levers 223 and 237, such movements will be in parallel planes. Rotary movement of the shaft 233 in one direction is imparted to the crank shaft 244 in the opposite direction by a pair of intermeshing gears 246 and 247 the former of which is rigidly mounted on the shaft 233 and the latter of which is rigidly mounted on the shaft 244. With the above arrangement, rotary movements of the shaft 209 will impart compound swinging movements to the levers 223 and 237 in opposite directions so that the closure forming or creasing heads 149 and 150 travel in circuitous paths as indicated by broken arrows in Fig. 11, and cause the shoes 217 to press the closure forming portions Z of the bag X against the intucking blades 158 and 159 with a wiping action, thereby creasing the folded side edge portions of the closure forming elements. The effective length of the shanks 224 and 238 may be varied by loosening of the clamp screws 226 and 240 on their respective clamping members 225 and 239. It will further be noted, by reference to Fig. 10, that the lower ends of the shanks 224 and 238 are mounted in slots 213' and 214' respectively so that said heads may be moved laterally toward and away from adjacent front and rear walls of the bag to compensate for any adjustment which may be made in the intucking blades 158 and 159. The arrangement and timing of the various components of the intucking and closure forming mechanism is such that when the intucking members 147 and 148 are in their full line inoperative positions of Fig. 8, the closure forming or creasing heads 149 and 150 will be disposed in their inoperative dotted line positions of Fig. 11 and, as soon as the intucking members 147 and 148 reach their bag intucked dotted line positions of Fig. 8, the creasing members 149 and 150 will have reached their full line positions as shown in Fig. 11 and move upwardly against closure forming portions Z of the bag with a wiping action to crease the side edges thereof against intucking blades therebehind.

*First pasting mechanism*

When the intucked bag X is conveyed to operating station C, suitable liquid gum or paste is applied to the intucked portions Y and inner wall surface portions of the closure forming elements Z. For this purpose I provide a pair of laterally spaced paste applicators 248 and 249 which are provided with paste ejecting nozzles 250 that direct streams of paste as above indicated. The paste applicators 248 and 249 in themselves are substantially identical to that disclosed and claimed in my co-pending application for United States Letters Patent, Serial No. 195,447, filed November 13, 1950, and entitled "Pasting Mechanism for Bag Closing and Sealing Machines," now matured into U. S. Patent No. 2,624,309. In the interest of brevity the applicators 248 and 249 will be described only in a general manner. Means for mounting the paste applicators 248 and 249 comprises a bracket 251 which includes a horizontally disposed supporting plate 252 adapted to rest upon the platform 83 on opposite sides of an opening 253 therein, and a pair of spaced parallel legs 254 depending from the plate 252 through the opening 253 in the platform 83. The opening 253 is of a size to permit lateral movement of the bracket 251 said bracket being guided for such movements by spaced parallel guide rails 255, and adapted to be frictionally locked in place by locking screw-equipped clamping plates 256 engaging the opposite side edge portions of the plate 252.

The lower end portions of the legs 254 are provided with axially aligned openings 257 in which are seated tubular bearings 258 one of which is shown, see Fig. 17. A pair of driving elements 259 are provided at their inner ends with tubular bosses 260 that are journalled in each of the tubular bearings 258 and which are centrally bored to receive the opposite stub shaft portions 261 of a pinion 262. The bosses 260 and the stub shaft portions 261 of the pinion 262 are keyed together for common rotation as indicated at 263. It should be noted by reference to Fig. 17, that the depending legs 254 are provided with laterally outwardly projecting bosses 264 whereby to provide adequate support for the bearings 258 and for another purpose hereinafter to be described. The driving members 259 further include radially outwardly extending arms 265 which are bifurcated at their outer ends to pivotally receive the upper ends of safety levers 266. Intermediate their ends, the levers 266 are provided with rollers 267 which are normally contained between pairs of teeth 268 and 269 on the radially outer ends of mounting blocks or the like 270 that are journalled on the outer end portion of the stub shaft 261. Each mounting block 270 adjacent its inner end is provided with a boss 271 which butts the adjacent side of its driving member 259. Each block 270 is further provided with a recess 272 the bottom of which is in the nature of an angular shoulder 273 surrounding the adjacent end of the shaft portion 261. Washers 274 mounted on the shaft portions 261 engage the shoulders 273 and are each held against axial outward movements on the adjacent shaft portion 261 by suitable means such as a snap ring or the like 275. Each roller 267 is yieldingly biased toward engagement with teeth 268 by a coil tension spring 276 anchored at one end to the free end of the adjacent lever 266 and at its other end to an adjustable nut-equipped stud 277 which extends through and is anchored in a supporting lug 278 integrally formed with the driving member 259. As further shown in Fig. 17, the paste applicator 248 is rigidly secured to the mounting block 270 by means of nut-equipped studs or the like 248' outwardly of the adjacent end of the shaft portion 261. It should be understood that while I have shown but one driving member 259, mounting block 270 and parts cooperating therewith, such construction is duplicated at the opposite side of the bracket 251 in connection with the applicator 249.

A pair of cam mounting brackets 279 are mounted one each on one of the bosses 264 of the legs 254 for swinging movements about the axes of the pinion 262 and the parts associated therewith. The brackets 279 each support a different segmental cam 280, one each associated with one of the paste applicators 248 and 249, see Figs. 12, 14 and 16. As fully described in my copending application above identified, each of the applicators are provided with a guide rod 281 extending longitudinally through the body 282 of the paste applicator, and a pump plunger 283 mounted for reciprocatory movements in the main body 282 in spaced parallel relationship to its cooperating guide rod 281. One end of each of the guide rods 281 extends outwardly of one end of its associated body 282 and engages one end of a coil compression spring 284, the other end of which thrusts against the outer end of a retaining arm 285 suitably anchored to the body 282. At their other ends, the guide rods 281 are rigidly connected to associated plungers 283 by head elements 286 each of which is equipped with a cam follower roller 287 that works against adjacent sides of its associated cam 280, against yielding bias of the spring 284 associated therewith.

The cams 280 are so designed that rotation thereof together with their respective mounting plates or brackets 279 about the axes of the tubular bosses 264 and the pinion 262 will change the length of the pumping strokes of their respective plungers 283. By this means, one or the other of the cams 280 may be quickly and easily adjusted so that the streams of paste ejected from each nozzle 250 will be identical to the other stream. Each of the cams 280 are provided with a laterally outwardly projecting flange 288 having an arcuate slot 280 therein and through which extends a clamping bolt 290 that is screw threaded into a bracket 291 whereby each cam 280 may be frictionally locked in adjusted set positions.

It will be noted that, as the paste applicators 248 and 249 rotate in a counterclockwise direction with respect to Figs. 12 and 16, the cams 280 will cause inward movement of the plungers 283 and paste to be ejected thereby through the nozzles 250 in parallel streams on the inner wall surfaces of the closure flap forming elements Z and on the intucked portions X. Limited rotary or oscillatory movements are imparted to the paste applicators 248 and 249 by a segmental gear element 292 having gear teeth 293 thereon which have meshing engagement with the teeth of the pinion 262 between the depending legs 254 of the bracket 251. The segmental gear 292 is pivotally secured to the legs for limited rotary or oscillatory movements as indicated at 294, see Figs. 12 and 16. The gear element is provided with a short arm 295 which provides a pivotal connection between the gear element 292 and a push rod 296 which at its lower end, is provided with a bifurcated head 297 that straddles the arm 295 and is pivotally connected thereto by a pin or shaft 298. The push rod 296 extends upwardly through an aperture 299 in the plate 252 and is provided at its upper end with an enlarged head 300 which is similar to the head 297 and which is pivotally connected to the outer end of one arm of a bell crank lever 301 by a pin or shaft 302. The bell crank lever 301 is mounted for rocking movements on a shaft 303 carried by a bearing bracket 304 mounted on the platform 83 and has pivotally connected to its other end, a pawl 305. As shown in Fig. 12, the pawl 305 is pivoted intermediate its ends to the bell crank 301 and at one end is formed to provide an abutment 306, its other end carrying a roller 307 that engages the outer cam acting end of a release arm 308, which at its other end is secured to a shaft 309 journalled in the bearing bracket 304. Journalled on the shaft 303 is a crank arm 310 having a cam follower roller 311 journalled at its outer end, said roller engaging the peripheral surface of a cam 312 mounted on the end of the shaft 185. The crank arm 310 is provided with a ratchet tooth 313 which is engageable with the abutment end 306 of the pawl 305 whereby swinging movements of the crank arm 310 in a counterclockwise direction with respect to Fig. 12 will cause swinging movement of the bell crank 301 in the same direction and downward movement of the push rod 296 and swinging movement of the gear element 292 in a clockwise direction to initiate paste ejecting movements to the paste applicators 248 and 249. A coil compression spring 314 is interposed between the head 300 and the washer 315 on the supporting plate 252 of the bracket 251 and biases the bell crank 301 in a direction to move the crank arm 310 into operative engagement with the cam 312, and also to move the gear element 292 in a direction to return the paste applicators 248 and 249 to their starting positions of Figs. 12, 14 and 16.

The pawl element 305 and its cam acting release arm 308 comprises part of a safety mechanism for preventing operation of the paste applicators 248 and 249 when an empty tray 93 arrives at the operating station C. Said safety mechanism further includes a crank acting arm 316 secured to the opposite end portion of the shaft 309, a rigid link 317 having one end pivotally secured to the outer end of the crank acting arm 316 as indicated at 318 and at its other end to the outer end of a second crank acting arm 319 as indicated at 320. The arm 319 is suitably anchored, as by welding or the like, to the upper end of a vertically disposed shaft 321 that is journalled in vertically spaced bearing brackets 322 and 323 rigidly mounted on the upper and lower end portions respectively of a vertically disposed supporting bar or post 324. The upper bracket 322 is bolted or otherwise anchored to the platform 83, see Figs. 3 and 12. A laterally projecting arm 325 is adjustably clamped to the lower end of the shaft 321 and at its outer end is provided with a bag engaging shoe 326 normally lying in the path of travel of a bag X approaching the station C. The shoe 326 is yieldingly biased toward its normal inoperative position in the path of travel of the bag X by a coil tension spring 327 suitably anchored at one end to the link 317 and at its other end to an anchoring pin 328 extending upwardly from the platform 83. When the shoe 326 is in its normal position, the abutment portion 306 of the pawl 305 is disposed in offset relation to the path of travel of the ratchet tooth 313. However, when a bag X approaches the station C, the shoe 326 is moved thereby against yielding bias of the spring 327 thus moving the cam acting member 309 in a clockwise direction with respect to Fig. 12 and permitting the abutment end 306 of the pawl 305 to be positioned for engagement with the ratchet tooth 313, whereupon rotation of the cam 312 will impart swinging movement to the bell crank lever 301 and resulting paste ejecting movements to the paste applicators 248 and 249.

In the event that one or both of the nozzles 250 become obstructed or otherwise inoperative to eject paste, pressure within the applicator body 282 may be built up to a point where part of the mechanism may be injured. In the event of an increase in pressure above a predetermined maximum within the applicator bodies, the rollers 267, upon rotation of the applicators, will move outwardly from the cam acting teeth 268 and 269 against yielding bias of the springs 276, at which point the applicators 248 and 249 will cease to rotate while the driving elements 259 will continue to move about the axes of the gear 262 and in common therewith. Upon return movement of the driving elements 259 to their normal starting positions of Fig. 12, the rollers 267 will ride over the teeth 268 and into the spaces therebetween and the teeth 269. When the rollers re-enter these spaces, the clicking noise made thereby is sufficiently loud to be clearly heard by the operator who can remedy the situation by shutting off the machine and cleaning out the nozzles 250 or replace the same.

To maintain the upper ends of the bag X in an intucked condition during the application of paste thereto at station C, I provide bag engaging shoes 329 that are mounted for lateral swinging movements into and out of engagement with the intucked portions of the bag, see Fig. 14. The shoes 329 are provided with upstanding shanks 330 that are longitudinally adjustably clamped one each in the lower end portion of each of a pair of tubular legs 331 and 332 the former of which is pivotally mounted at its upper end on a shaft 333 carried by a supporting bracket 334 depending from an outer end portion of the platform 83. The latter leg 332 is rigidly mounted at its upper end on a rock shaft 335 which is journalled in a bearing bracket 336 depending from the platform 83 on the opposite side of the paste applicator apparatus from the bracket 334. A rigid link 337 is pivotally connected at one end to a crank arm 338 anchored to the shaft 333 and extending downward therefrom, and at its other end to the radially outer end of an upwardly extending crank arm 339 fast on the shaft 335. By this means, swinging movement of one of the legs 331 or 332 in one direction will impart corresponding swinging movements of the other thereof in the opposite direction, so that, the shoes 329 will move simultaneously into and out of engagement with the intucked portions Y of the bag X. A cam 340 rigidly mounted on the shaft 185 imparts swinging movements to the legs 331 and 332 through a cam follower roller 341 journalled on a thrust bar 342, which at its lower end, is connected to the outer end of a crank arm 343 as indicated at 344. The inner end of the crank arm 343 is anchored to one end of the shaft 335, see Figs. 12 and 14. As shown in Fig. 15, the upper end of the bar 342 is bifurcated to provide a fork 345 which straddles the shaft 185 adjacent the cam 340 whereby to guide the thrust bar 342 in its cam imparted movements. A coil tension spring 346 is anchored at one end to the crank arm 343 and at its other end to the platform 83 and biases the cam operated mechanism including the shoes 329 toward their inoperative positions at opposite sides of the bag X.

*Second pasting and sealing mechanism*

The platform 83 supports a pair of laterally spaced parallel depending plate-like members 347 and 348 which carry therebetween an open topped paste pan or tray 349 the forward end of which is closed by a paste roller 350. The paste pan and roller are of the type disclosed and claimed in my co-pending application for United States Letters Patent, Serial No. 214,940, filed March 10, 1951, and entitled "Pasting Mechanism for Bag Closing and Sealing Machines", now U. S. Patent No. 2,683,435. The roller 350 carries a relatively thin coating of paste on its peripheral surface and is adapted to apply the paste to the inner wall of one of the closure forming flap elements of the bag X when the bag reaches the closing and sealing station D. The roller 350 has a shaft portion 351 extending outwardly of the member 347 and is driven by a link chain 352 running over a sprocket 353 rigidly mounted on said outer end and another sprocket 354 rigidly mounted on one end of a shaft 355 journalled in suitable bearings in the plate-like members 347 and 348. The other end of the shaft 355 is connected to the driving mechanism, not shown, of the conveyor belt 135 of the delivery conveyor E by means of a universal joint-equipped drive shaft 356, suitable gears not shown but contained within a gear housing 357 and a vertical shaft 358 extending downwardly from the gear housing 357 to the driving mechanism for the conveyor belt 135. The belt 135 may be assumed to be driven from the motor 116 in the base 2 by means of a sprocket wheel 359 and a link belt or chain 360, see Fig. 34.

Liquid adhesive or paste is supplied to the paste pan 349 and to the paste applicators 248 and 249 from a supply reservoir not shown, through suitable conduit means 361 extending from the reservoir upwardly along the frame members 76 and 77 and across the bridge beam 78, and branch tubes 362 and 363 leading to the paste applicators and paste pan respectively. A pump 364 is mounted within the base 2 and is interposed in the supply line 361 whereby to feed the paste therethrough from the reservoir to the applicators and pan. The pump 364 is driven from the motor 116 by means of an endless link chain 365 running over a sprocket 366 on the motor shaft 121 and a sprocket wheel 367 on the shaft 368 of the pump 364. As shown in Figs. 2 and 18, a valve 369 is interposed in the branch conduit 363 to control the rate of feed of liquid adhesive to the paste pan 349.

An elongated curved deflector plate 370 is mounted forwardly of and partially under the paste roller 350 in the path of travel of the closure flap elements Z of the bags and is adapted to move the leading closure flap downwardly into engagement with the overlying intucked portions Y as the bag moves forwardly thereunder into the second pasting and sealing station D. As the bag X comes to rest in the station D, the leading closure flap element of the bag is pressed downwardly against the intucked portions and the trailing closure flap element extends upwardly against upper edge portion of the deflector plate in closely spaced relation to the paste roller 350 above the deflector plate. Paste is applied to the inner surface of the trailing closure flap element by moving its upper edge portion momentarily into engagement. This is accomplished automatically by the action of a sweep 371 comprising a head element 372 and a pair of laterally spaced flexible rubberlike blades 373 extending generally in a direction axially of the roller 350. The head 372 is provided with an upwardly extending shank 374 that is adjustably secured in a clamping member 375 rigidly mounted on a rock shaft 376 that is journalled at its opposite ends in suitable bearings in the plate-like members 347 and 348. A crank arm 377 extends radially outwardly from the rock shaft 376 in a direction substantially diametrically opposite the clamping member 375 and cooperates therewith to define a lever the fulcrum of which comprises the axis of the shaft 376. A rigid link or bar 378 is pivotally connected at its lower end to the outer end of the crank arm 377 as indicated at 379 and terminates at its upper end in a fork element 380 which straddles horizontal shaft 185. Intermediate its ends, the bar 378 is provided with a cam follower roller 381 that engages the peripheral surface of a cam 382 fast on the shaft 185. The sweep 371, together with the operating mechanism therefor is yieldingly biased in a direction to move the blades 373 of the sweep toward engagement with the top portion of the bag closure element above the deflector 370, and the cam follower roller 381 toward its cooperating cam 382 by a coil tension spring 383 anchored at one end to the lower end portion of the bar 378 and at its upper end to a portion of the platform 83. The cam 382 is of such outline as to permit spring imparted movements of the sweep 371 from its inoperative full line position of Fig. 19 to its bag pasting operative position indicated by dotted lines in Fig. 19. Movement of the sweep from its operative position to its inoperative position is positively imparted to the linkage associated therewith by the cam 382 against the bias of the spring 383.

A control mechanism for the immediately above described mechanism includes a bag engaging shoe or plate 384 which is disposed normally in the path of rotary travel of the bag X about the axis of the post 79, and adapted to intercept and be moved by the bag X as the same enters the station D. The shoe 384 comprises the outer end of a horizontally disposed crank acting arm 385 that is anchored to the lower end of a vertically disposed shaft or the like 386 that is mounted for rotation in a pair of brackets 387 bolted or otherwise rigidly secured to the plate-like member 348. The shaft is yieldingly biased in one direction of rotary movement by a torsion spring 388 having one end anchored in a collar or the like 389 rigidly secured to the shaft 386, and its other end anchored in one of the bearing brackets 387. The spring 388 urges the shoe 384 toward a position wherein it will be engaged and moved by the bag X entering the station D. A crank arm 390 is anchored to the upper end of the shaft 386 and at its outer end is pivotally secured to one end of a rigid link 391 to the other end of which is pivotally secured the outer end of a lever 392 pivoted on a bracket 393 on the platform 83. The free end of the lever 392 provides a stop lug 394 which is engageable with an abutment plate 395 on the bar 378 whereby to limit the bar 378 and the sweep 371 in their spring operated movements in the direction of operative position of the sweep 371. Thus, when an empty bag supporting tray 93 moves into the station D, the sweep 371 is positively locked against swinging movement toward engagement of the blades 373 thereof directly with the paste roller 350. Hence there is no possibility of paste being applied to the blades 373 when there is no bag positioned to be pasted.

As hereinafter described with respect to Figs. 3 and 20 to 22 inclusive, when the sweep 371 has brought the trailing closure flap element into paste receiving contact with the paste roller 350, the pusher element 132 moves the bag X onto the conveyor belt 135 of the delivery conveyor E. As the pasted closure flap element moves out of registration with the paste roller, it is bent downwardly towards sealing contact with the underlying closure flap element and the intucked portions of the bag by a bag closing arm 396 which comprises a bag outer wall engaging portion 397 that extends generally longitudinally of the path of travel of the bag away from the station D and slopes downwardly towards its outer end, and an upwardly extended crank acting portion 398 which terminates in a collar 399 fast on one end of a rock shaft 400 journalled at its opposite ends in suitable bearings in the plate-like members 347 and 348. The rock shaft 400 extends longitudinally of the path of travel of the bag X away from the station D and is provided adjacent its other end with a crank arm 401 to the outer end of which is pivotally connected the lower end of a pitman-like arm 402 which, like the bar 378, is provided with a fork-like upper end 403 that straddles the shaft 185. A cam follower roller 404 is journalled on a stub shaft 405 on the pitman arm 402 intermediate its ends, and engages a cam 406 rigidly secured to the shaft 185 for common rotary movements therewith. A coil tension spring 407 has its lower end secured to the crank arm 401 and its upper end anchored to a portion of the platform 83 to yieldingly urge the cam follower roller 404 into engagement with its cooperating cam 406, and the bag closing arm 396 in one direction of swinging movement about the axis of the rock shaft 400. The cam 406 is so arranged that swinging movement is imparted thereby to the arm 396 in a counterclockwise direction with respect to Fig. 19 as the bag X leaves the tray 93 whereby to fold the pasted closure flap element downwardly over its cooperating closure flap to seal the bag. This action occurs as the bag moves laterally outwardly beyond the outer end of the deflector plate 370. The bag is then carried by the conveyor belt 135 under a pressing shoe 408 that is carried by a supporting frame 409 by means of a pair of arms 410 each pivotally secured at one of their ends to hinge brackets 411 on the plate or shoe 408 and at their other ends to the frame 409 as indicated at 412. The frame 409 also carries a pair of laterally spaced guide plates 413 to prevent tipping of the bags as they are carried away from the machine by the conveyor belt 135. The weight of the shoe 408 is sufficient to maintain the tops of the bags closed while the same are being transported to the conveyor 8 which is of conventional design and which, not in itself comprising the invention, is not described in detail. Means for transferring the bags X from the conveyor belt 135 to the conveyor 8 comprises a reciprocatory pusher plate 414 carried by a piston plunger 415 that is extendable and retractable with respect to a cooperating fluid pressure cylinder 416, see Fig. 20. The pusher plate 414 and the cylinder 416 are carried by a suitable guide frame 417 mounted on the frame structure 1 of the machine. A control member for the pusher plate 414 is preferably in the nature of a switch not shown but contained in a switch housing 418 suitably mounted in the path of travel of the bag X and controlling a conventional solenoid operated valve 419 which is interposed in a fluid pressure circuit including the cylinder 416, conduit means 420, and a conventional pressure pump and fluid reservoir not shown.

*Platform height adjusting mechanism*

With reference particularly to Figs. 2 and 3, it will be seen that the legs 76 and 77 of the U-shaped structure 3 are provided with dovetail guide rails or the like 421 and that the platform 83 is provided with gibs 422 that cooperate with the guide rails 421 to permit relative sliding movements between the legs 76 and 77 and the platform 83 in a vertical direction. The legs 76 and 77 are provided with vertical extending slots 423 through which nut-acting brackets 424 extend laterally outwardly from the opposite ends of the platform 83. As shown in Figs. 3 and 23, the brackets 424 are bolted or otherwise rigidly secured to the opposite ends of the platform 83. A pair of elevating screws 425 and 426 extend longitudinally of and are journalled for rotation on the legs 76 and 77 respectively and have threaded engagement one each with one of the nut-acting brackets 424. Sprocket wheels 427 are rigidly secured one each to the upper end of each of the screws 425 and 426 at the top of the frame 3, said sprocket being connected by an endless link chain 428. A second sprocket wheel 429 is mounted on the extreme upper end of the shaft 426 and has running thereover an endless link chain 430 that also runs over a cooperating sprocket wheel mounted on the upper end of an output shaft 432 of a geared head electric motor or the like 433. As shown in Figs. 1, 2 and 26, the motor 433 is rigidly secured to a motor bracket 434 on the upper end of the leg 77. The motor is one of any number of conventional reversing motors and, if desired, may be controlled by suitable switch means not shown but which may be interposed in the path of travel of the upper end portion of a bag being transferred from the receiver to the bag supporting tray 93 at the receiving station A. Preferably, however, the motor 433 is manually controlled by the operator through a conventional reversing switch not shown but contained in a control box or the like 435. The above arrangement provides for the rapid raising or lowering of the platform 83, and the several mechanisms carried thereby, with respect to the bag transporting means, so that when a group of bags being fed through the machine is to be followed by another group of bags, of a height different from the first group, the operator can readily adjust the height of the platform so that the various mechanisms thereon will be disposed at the correct working height for the following group without appreciable loss of time. With reference to Figs. 2, 20 and 21 it will be seen that the frame 409 is mounted for vertical sliding movements on a pair of laterally spaced upstanding legs 436 and supported by a vertically extended height adjusting screw 437 that is screw threaded at its lower end in the supporting structure 1 and that terminates at its upper end in a gear box 438. Conventional gearing not shown but contained within the gear box 438 connects the upper end of the screw 437 with one end of a drive shaft 439 through a universal joint or the like 440. The other end of the drive shaft 439 is coupled, by means of a second universal joint 440 to a stub shaft 441 which is coupled to the platform height adjusting screw 436 through suitable gearing not shown but contained within a gear box 442 rigidly mounted on the leg 77 of the frame 3. Thus the height of the pressing shoe 408 is adjusted with respect to the conveyor belt 135 simultaneously with the adjustment of height of the platform 83 and mechanism carried thereby.

*Operation*

When one of a plurality of bags in succession is delivered to the receiver between the forming plates 16 and 17, fluid under pressure is introduced to the cylinder 28 in a direction to move the forming plates 16 and 17 into momentary bag wall flattening engagement with the bag. Upon return of the forming plates 16 and 17 to their inoperative positions, the bag X is pushed by a succeeding bag onto the carriage 14 between the holding plates 34 and 35 to a point where the side wall of the bag engages and moves a switch actuating arm 443 of a conventional switch 444, see Fig. 4. Closing of the switch 444 by the bag causes fluid under pressure to be introduced to the cylinders 28, 47 and 53, by means of conventional solenoid operated valve mechanisms, not shown, in a manner to cause the forming plates 16 and 17 and the holding plates 34 and 35 to be moved into engagement with the adjacent front and rear walls of the bag, and to move the carriage 14 from its full line bag receiving position of Fig. 6 to its bag transferring position indicated by dotted lines in Fig. 6. As shown in Figs. 4 and 6, switch actuating buttons 445 and 446 on the carriage 14 are adapted to operate control switches 447 and 448 respectively mounted on the top plate 81 of the base 2. When the carriage 14 reaches its bag transferring position, the switch 448 is closed by action of the actuating button 446 to cause fluid to be introduced to the cylinder 70 in a direction to move the pusher plate 59 in a direction to transfer the bag from the carriage 14 toward the bag supporting tray 93. As the pusher plate 59 reaches its forwardmost position as indicated by full lines in Fig. 5, the switch operating member 130 causes the switch within the housing 128 to be closed to actuate the cylinder 53 in a manner to return the carriage to its bag receiving position of Fig. 4. As hereinafter indicated, the switch within the housing 128 is also utilized to initiate a cycle of partial rotation of the shaft 79 and parts carried thereby to advance the bags X to a succeeding station. When the carriage 14 returns to its bag receiving position of Fig. 4, a switch actuator 445 engages the switch 447 to cause the cylinders 28 and 47 to operate in a manner to spread their respective forming plates 16—17 and 34—35 apart and to operate the cylinder 70 in a manner to retract the pusher plate 59. The arrangement of the several switches above described is but one of many which may be utilized to cause the above functions. For this reason, and the fact that the control means for these operating mechanisms do not in themselves form the instant invention, the same are not shown and described in greater detail.

The timing of the various operating mechanisms is such, that the bag transferring mechanism, the intucking and closure forming mechanism and the first and second pasting mechanisms operate simultaneously while the movement of the bag supporting means are arrested after each quarter turn thereof. Bag ejecting movements of the pusher element 132 are initiated immediately after the trailing bag closure forming element Z has been moved into paste receiving contact with the pasting roller 350 by the sweep 371. During rotation of the bag supporting means to transport the bags from one station to another, the bags are prevented from sliding radially outwardly from the bag supporting means under the action of centrifugal force, by circumferentially spaced arcuate barrier elements 449, a diametrically opposed pair of which is supported from the base 2 by upright supporting posts 450, and one of which is mounted on the leg 76 by means of laterally extended arms 451, see Figs. 1 and 2.

My invention has been thoroughly tested and found to be completely satisfactory for the accomplishment of the objectives set forth; and while I have shown and described a commercial form of my novel bag closing and sealing machine, it will be understood that the same is capable of modification without departure from the spirit and scope of the invention as defined in the claims.

What I claim is:

1. In a machine for closing and sealing filled bags, a frame structure, means carried by the frame structure and including a bag supporting element for receiving and transporting a filled bag, power operated mechanism for imparting intermittent movement to the bag supporting element to deliver the filled bag successively to a plurality of spaced stations, power operated mechanism at one of said stations and comprising opposed intucking members and cooperating creasing members for forming a top closure for the bag, mechanism located at a different one of said stations for applying adhesive to the intucked and creased top portion of the bag, mechanism at another station for moving the filled bag out of engagement with the bag supporting element, bag closing means engageable with the intucked and creased closure forming portion of the bag to fold the same into closed relationship, and means for simultaneously adjusting the height of the bag top folding and adhesive applying mechanisms and bag closing means relative to the bag supporting element, whereby said mechanisms and bag closing means cooperate to close and seal bags of various heights.

2. In a machine for closing and sealing filled bags, a frame structure, means carried by the frame structure and including a bag supporting element for receiving and transporting a filled bag, power operated mechanism for imparting intermittent movement to the bag supporting element in a circular path about a vertical axis successively to a plurality of stations circumferentially spaced about said axis, power operated mechanism at one of said stations comprising a pair of opposed intucking members and opposed cooperating creasing members for forming a top closure for the bag, mechanism located at a different one of said stations for applying adhesive to the intucked and creased top portions of the bag, mechanism at another station for moving the filled bag out of engagement with the bag supporting element, a guide member engageable with the intucked and creased closure forming portion of the bag to fold the same into closed relationship, and mechanism for simultaneously moving the bag top folding and adhesive applying mechanisms, and guide member in a vertical direction relative to the bag supporting element, whereby said mechanisms cooperate to close and seal bags of various heights.

3. In a machine for closing and sealing filled bags, a frame structure, means for forming the filled bags into substantially rectangular form in cross section, means carried by the frame structure and including a bag supporting element for receiving and transporting a filled bag, power operated mechanism for imparting intermittent movement to the bag supporting element to deliver the filled bag successively to a plurality of spaced stations, a platform overlying the path of travel of the bag supporting element, power operated mechanism carried by said platform at one of said stations and comprising a pair of opposed intucking members and opposed cooperating creasing members for forming a top closure for the bag, an adhesive applicator carried by said platform at a different one of said stations for applying adhesive to the intucked and creased top portion of the bag, mechanism at another station for moving the filled bag out of engagement with the bag supporting element, a guide member carried by said platform and engageable with the intucked and creased closure forming portion of the bag to fold the same into closed relationship, means mounting said platform for movements toward and away from the path of travel of the bag supporting element, and power operated mechanism for imparting such movements to said platform whereby to vary the distance between the parts carried thereby and the bag supporting element.

4. In a machine for closing and sealing filled bags, a frame structure, means carried by the frame structure and including a bag supporting element for receiving and transporting a filled bag, power operated mechanism for imparting intermittent movement to the bag supporting element in a circular path about a vertical axis successively to a plurality of stations circumferentially spaced about said axis, a platform overlying the path of travel of the bag supporting element, power operated mechanism carried by said platform at one of said stations and comprising a pair of opposed intucking members and opposed cooperating creasing members for forming a top closure for the bag, an adhesive applicator carried by said platform at a succeeding station for applying adhesive to the intucked and creased top portion of the bag, mechanism at another station for moving the filled bag out of engagement with the bag supporting element, means carried by said platform and engageable with the intucked and creased closure forming portion of the bag to fold the same into closed relationship, means mounting said platform for vertical movements toward and away from the path of travel of the bag supporting elements, and power operated mechanism for imparting such movements to said platform whereby to vary the distance between the parts carried thereby and the bag supporting element.

5. In a machine for closing and sealing filled bags, a frame structure, a vertical rotary shaft journalled in said frame structure, a bag supporting element mounted on said shaft for common rotation therewith, power operated means for imparting intermittent rotary movement to said shaft to transport a filled bag carried by the bag supporting element successively to a plurality of stations circumferentially spaced about the axis of the shaft, power operated mechanism at one of said stations comprising a pair of opposed intucking members and opposed cooperating creasing members for forming a top closure for the bag, adhesive applicator meachnism at a succeeding station for applying adhesive to the intucked and creased top portion of the bag, mechanism at another station for moving the filled bag out of engagement with the bag supporting element, a guide member engageable with the intucked and creased closure forming portion of the bag to fold the same into closed relationship, a common drive shaft for said power operated mechanism, and power operated mechanism and guide member for simultaneously moving the bag top folding, adhesive applying, and bag closing mechanisms in a vertical direction relative to the bag supporting element, whereby said mechanisms cooperate to close and seal bags of various heights.

6. In a machine for closing and sealing filled bags, a frame structure, a vertically extended rotary shaft journalled in said frame structure, a bag supporting element mounted on said shaft for common rotation therewith, power operated means for imparting intermittent rotary movement to said shaft to transport a filled bag carried by the bag supporting element successively to a plurality of stations circumferentially spaced about the axis of the shaft, a generally horizontally disposed platform overlying the path of travel of the bag supporting element, means mounting and guiding said platform on said frame structure for vertical movements toward and away from the bag supporting element, power operated mechanism carried by said platform at one of said stations and comprising a pair of opposed intucking members and opposed cooperating creasing members for forming a top closure for the bag, an adhesive applicator carried by the platform at a succeeding station for applying adhesive to the intucked and creased top portion of the bag, mechanism at another station for moving the filled bag out of engagement with the bag supporting element, means carried by the platform and engageable with the intucked and creased closure portion of the bag to fold the same into closed relationship, power operated mechanism for imparting vertical movements to the platform to vary the distance between the parts carried thereby and the bag supporting element, and means for maintaining a bag in an upright position on the bag supporting element during its travel to the several stations, said means including a pair of laterally spaced parallel arms engageable one each with an opposite side of the bag, said arms being carried by the platform for common vertical movements therewith and coupled to said vertical shaft for common rotation therewith.

7. In a machine for closing and sealing filled bags, a frame structure, means carried by the frame structure and including a bag supporting element for receiving and transporting a filled bag, power operated mechanism for imparting intermittent movement to the bag supporting element to deliver the filled bags successively to a plurality of spaced stations, a platform overlying a path of travel of the bag supporting element, power operated mechanism carried by said platform at one of said stations and comprising a pair of opposed intucking members and opposed cooperating creasing members for forming a top closure for the bag, an adhesive applicator carried by said platform at a different one of said stations for applying adhesive to a predetermined area on the intucked and creased top portion of the bag, a second adhesive applicator comprising a power driven applicator roller carried by the platform at another station for applying adhesive to another predetermined area of said portion of the bag, mechanism at said last mentioned station for moving the filled bag out of engagement with the bag supporting element, means carried by the platform and engageable with the intucked and creased closure forming portion of the bag to fold the same into closed relationship, means mounting said platform for movements toward and away from the path of travel of the bag supporting element, and power operated mechanism for imparting such movements to said platform whereby to vary the distance between the parts carried thereby and the bag supporting element.

8. In a machine for closing and sealing filled bags, a frame structure, means carried by the frame structure and including a plurality of spaced movable bag supporting elements for receiving and transporting filled bags, means for feeding said filled bags to said supporting elements, power operated mechanism for imparting intermittent movements to the supporting elements simultaneously to deliver the filled bags successively to one of a plurality of stations spaced apart substantially equal to the spacing of the bag supporting elements, power operated mechanism at one of said stations comprising a pair of opposed intucking members and opposed cooperating creasing members for forming top closures for the bags in succession, mechanism located at a different one of said stations for applying adhesive to the intucked and creased top portions of the bags in succession, mechanism at another station for moving the filled bags out of engagement with their respective bag supporting elements, means engageable with the intucked and creased closure forming portions of the bags in succession to fold the same into closed relationship, and mechanism for simultaneously moving the bag top folding and adhesive applying mechanisms and bag closing means relative to the bag supporting elements whereby said mechanisms cooperate to close and seal bags of various heights.

9. In a machine for closing and sealing filled bags, a frame structure, means carried by the frame structure and including a plurality of spaced movable bag supporting elements for receiving and transporting filled bags, means for feeding said filled bags to the supporting elements, power operated mechanism for imparting intermittent movements to the supporting elements simultaneously to deliver the filled bags successively to one of a plurality of stations spaced apart substantially equal to the spacing of the bag supporting elements, a generally horizontally disposed platform overlying the path of travel of the bag supporting elements, means mounting and guiding said platform on the frame structure for movements toward and away from the bag supporting elements, power operated mechanism carried by said platform at one of said stations and comprising a pair of opposed intucking members and opposed cooperating creasing members for forming top closures for the bags in succession, an adhesive applicator carried by the platform at a succeeding station for applying adhesive to the intucked and creased top portions of the bags in succession, mechanism at another station for moving the filled bags successively out of engagement with their respective bag forming elements, means carried by the platform adjacent said last-mentioned station engageable with the intucked and creased closure forming portions of said bags in succession to fold the same into closed relationship, and power operated mechanism for imparting movements to said platform to vary the distance between the parts carried thereby and the bag supporting elements.

10. The structure defined in claim 9 in which said bag supporting elements comprise a turntable rotatable about a vertical axis, and in which said platform is mounted for vertical movements toward and away from said turntable.

11. The structure defined in claim 9 in further combination with means for maintaining the bags in upright positions on their respective supporting elements, said means comprising a plurality of pairs of laterally spaced parallel arms, one each of said pairs associated with each supporting element in overlying spaced relation thereto, one arm of each pair being engageable with an opposite side of a bag on the supporting element associated therewith, said arms being carried by the platform for common movements therewith toward and away from the supporting elements and for common transporting movements with said supporting elements.

12. In a machine for closing and sealing filled bags, means for supporting a filled bag to be closed, a pair of opposed intucking members each operative to intuck an opposite side of the top portion of the bag, means mounting and guiding the intucking members for relative movements toward and away from each other, each of said members comprising a pair of laterally spaced blades engaging the adjacent upper side wall portion of the bag in closely spaced relation to the front and rear walls thereof upon relative movements of said members toward each other, a pair of opposed creasing members engageable with the upper end portions of the front and rear walls of the bag and cooperating with the adjacent blades of said intucking members to form the upper end portions of said front and rear walls into top closure flaps adapted to overlie the intucked portions thereof, means mounting said creasing members for movements toward and away from creasing engagement with the upper portions of the bag, and power operated mechanism for imparting said movements to the intucking members and the creasing members in definite timed relationship.

13. In a machine for closing and sealing filled bags, means for supporting a filled bag to be closed, a pair of opposed intucking members each operative to intuck an opposite side of the top portion of the bag, means mounting and guiding the intucking members for relative movements toward and away from each other in a straight line, each of said members comprising a pair of laterally spaced blades engaging the adjacent upper side wall portion of the bag in closely spaced relation to the front and rear walls thereof upon relative movements of said members toward each other, a pair of opposed creasing members engageable with the upper end portions of the front and rear walls of the bag and cooperating with the adjacent blades of said intucking members to form the upper end portions of said front and rear walls into top closure flaps adapted to overlie the intucked portions thereof, means mounting said creasing members for movements toward and away from creasing engagement with the upper portions of the bag, power operated mechanism for imparting said movements to the intucking members and the creasing members in definite timed relationship, and means for adhering said closure flaps to said intucked portions and to each other to seal the bag.

14. In a machine for closing and sealing filled bags, means for supporting a filled bag to be closed, a pair of opposed intucking members each operative to intuck an opposite side of the top portion of the bag, means mounting and guiding the intucking members for relative movements toward and away from each other in a straight line, said last mentioned means comprising a guide bar overlying the bag and extending transversely thereof, each of said intucking members including a head slidable on said guide bar and a pair of laterally spaced blades depending from each of said heads and engageable with the adjacent upper side wall portion of the bag in closely spaced relation to the front and rear walls thereof upon relative movements of said intucking members toward each other, a pair of opposed creasing members engageable with the upper end portions of the front and rear walls of the bag and cooperating with the adjacent blades of said intucking members to form the upper end portions of said front and rear walls into top closure flaps adapted to overlie the intucked portions thereof, means mounting said creasing members for movements toward and away from creasing engagement with the upper portions of the bag, and power operated mechanism for imparting said movements to the intucking members and the creasing members in definite timed relationship.

15. In a machine for closing and sealing filled bags, means for supporting a filled bag to be closed, a pair of opposed intucking members each operative to intuck an opposite side of the top portion of the bag, a support overlying said members, means carried by the support for mounting and guiding the intucking members for relative movements toward and away from each other, a pair of opposed creasing members engageable with the upper end portions of the front and rear walls of the bag and cooperating with the intucking members to form the upper end portions of said front and rear walls into top closure flaps adapted to overlie the intucked portions of the bag, means mounting said creasing members for movements toward and away from creasing engagement with the upper portions of the bag, and power operated mechanism for imparting said movements to the intucking members and the creasing members in definite timed relationship, said last mentioned means including a pair of levers pivotally connected to said support for swinging movements on spaced parallel axes, one each of said levers having operative engagement with one of the intucking members, and linkage connecting said levers, whereby swinging movement of one thereof in one direction will impart corresponding swinging movement to the other thereof in the opposite direction.

16. The structure defined in claim 15 in which said intucking members each comprises a head slidable on said mounting and guiding means and a pair of laterally spaced blades depending from the head and engaging the adjacent upper side wall portion of the bag in closely spaced relation to the front and rear walls thereof upon relative movements of said members toward each other.

17. The structure defined in claim 16 in which the blades on each of said heads are mounted for movements toward and away from each other, and in further combination with means for locking the blades on their respective heads in desired set positions, whereby to adapt said intucking members for operation upon bags of various dimensions between the front and rear walls thereof.

18. The structure defined in claim 15 in which said linkage comprises an extensible and contractable arm by means of which the areas of travel of the intucking members may be shifted toward and away from each other, whereby to accommodate bags of various widths.

19. In a machine for closing and sealing filled bags, means for supporting a filled bag to be closed, a pair of opposed intucking members each engageable with an opposite site of the top portion of the bag, means mounting and guiding the intucking members for relative movements toward and away from each other, a pair of opposed creasing members each including a holder and a pair of creasing shoes manually mounted thereon, one pair of said shoes being engageable with the upper end portion of the front wall of the bag and the other pair of said shoes being similarly engageable with the upper end portion of the rear wall of the bag, said shoes cooperating with the intucking members to form the upper end portions of said front and rear walls into top closure flaps adapted to overlie the intucked portions of the bag, means mounting said creasing members for movements toward and away from creasing engagement of said shoes with the upper portions of the bag, and power operated mechanism for imparting said movements to the intucking members and the creasing members in definite timed relationship, the mounting of the shoes on said holders permitting said shoes to follow generally the contours of their cooperating intucking members and the bag during said creasing engagement.

20. In a machine for closing and sealing filled bags, means for supporting a filled bag to be closed, a pair of opposed intucking members each operative to intuck an opposite side of the top portion of the bag, means mounting and guiding said intucking members for relative movements toward and away from each other, said intucking members each including a pair of laterally spaced blades engaging the adjacent upper side wall portion of the bag in closely spaced relation to the front and rear walls thereof upon relative movements of said members toward each other, the blades of each of said members converging in the direction of the opposite one of said intucking members, a pair of opposed creasing members each including a holder and a pair of creasing shoes movably mounted thereon, one pair of said shoes being engageable with the upper end portion of the front wall of the bag and the other pair of said shoes being similarly engageable with the upper end portion of the rear wall of the bag, said shoes cooperating with the intucking members to form the upper portion of said front and rear walls into top closure flaps adapted to overlie the intucked portions of the bag, means mounting said creasing members for movements toward and away from creasing engagement of said shoes with the upper portions of the bag, and power operated mechanism for imparting said movements to the intucking members and the creasing members in definite timed relationship, the mounting of the shoes on said holders permitting said shoes to follow generally the contours of their cooperating blades of said intucking members and the bag during said creasing engagement.

21. In a machine for closing and sealing filled bags, means for supporting a filled bag to be closed, a pair of opposed intucking members each engageable with an opposite side of the top portion of the bag, means mounting and guiding the intucking members for relative movements toward and away from each other, a pair of opposed creasing members engageable with the upper end portions of the front and rear walls of the bag and cooperating with the intucking members to form the upper end portions of said front and rear walls into top closure flaps adapted to overlie the intucked portions, means mounting said creasing members for movements about circuitous paths during which movements wiping engagement is made between the creasing members and the upper portions of the bag, and power operated mechanism for imparting said movements to the intucking members and the creasing members in definite timed relationship.

22. In a machine for closing and sealing filled bags, means for supporting a filled bag to be closed, a pair of opposed intucking members each engageable with an opposite side of the top portion of the bag, means mounting and guiding the intucking members for relative movements toward and away from each other, a pair of opposed creasing members each including a holder and a pair of creasing shoes movably mounted thereon, one pair of said shoes being engageable with the upper end portion of the front wall of the bag and the other pair of said shoes being similarly engageable with the upper end portion of the rear wall of the bag, said shoes cooperating with the intucking members to form the upper end portions of said front and rear walls into top closure flaps adapted to overlie the intucked portions of the bag, means mounting said creasing members for movements about circuitous paths during which movements wiping engagement is made between said creasing shoes and the upper portions of the front and rear walls of said bag, and power operated mechanism for imparting said movements to the intucking members and the creasing members in definite timed relationship, the mounting of the shoes on said holders permitting said shoes to follow generally the contours of their cooperating intucking members and the bag during said wiping engagement.

23. In a machine for closing and sealing filled bags, means for supporting a filled bag to be closed, a pair of opposed intucking members each engageable with an opposite side of the top portion of the bag, means mounting and guiding the intucking members for relative movements toward and away from each other, a pair of opposed creasing members engageable with the upper end portions of said front and rear walls of the bag and cooperating with the intucking members to form the upper end portions of said front and rear walls into top closure flaps adapted to overlie the intucked portions, means mounting one of said creasing members for movements about a circuitous path during which movements wiping engagement is made between said creasing member and the adjacent upper portion of the bag, said last mentioned means comprising a rock arm, means journalling one end of said rock arm for swinging movements about a horizontal axis, a lever pivotally secured intermediate its ends to the free end of said rock arm, said one of the creasing members being mounted on one end of said lever, a rotary crank shaft, and a crank arm connecting said crank shaft with the opposite end of said lever, whereby rotation of said crank shaft will impart compound swinging movements to said lever about the axis of its pivotal connection with the rock arm and about the axis of said rock shaft, and power operated mechanism for imparting said movements to the intucking members and said lever in definite timed relationship.

24. In a machine for closing and sealing filled bags, means for supporting a filled bag to be closed, a pair of opposed intucking members each engageable with an opposite side of the top portion of the bag, means mounting and guiding the intucking members for relative movements toward and away from each other, a pair of opposed creasing members engageable with the upper end portions of said front and rear walls of the bag and cooperating with the intucking members to form the upper end portions of said front and rear walls into top closure flaps adapted to overlie the intucked portions, means mounting said creasing members for movements about circuitous paths during which movements wiping engagement is made between said creasing members and the upper portions of the bag, said last mentioned means comprising a pair of rock arms, means journalling the inner ends of said rock arms for swinging movements about a horizontal axis, a pair of levers one each pivotally secured intermediate its ends to the free end of each of said rock arms, said creasing members being mounted one each on the lower end of one of said levers, a pair of crank shafts journalled for rotation on axes parallel to the axis of swinging movements of said rock arms, and a pair of crank arms one each connecting one of said crank shafts with the opposite end of one of said levers, rotation of said crank shafts imparting compound swinging movements to their respective levers each about the axis of its pivotal connection with its respective rock arm and about the axis of swinging movement of its respective rock arm, and power operated mechanism for imparting said movements to the intucking members and rotary movements to the crank shafts in opposite directions to each other and in definite timed relationship to the movements imparted to the intucking members.

25. In a machine for closing and sealing filled bags, means for supporting a filled bag to be closed, a pair of opposed intucking members each engageable with an opposite side of the top portion of the bag, means mounting and guiding the intucking members for relative movements toward and away from each other, a pair of opposed creasing members engageable with the upper end portions of the front and rear walls of the bag and cooperating with the intucking members to form the upper end portions of said front and rear walls into top closure flaps adapted to overlie the intucked portions, means mounting said creasing members for movements about circuitous paths during which movements wiping engagement is made between the creasing members and the upper portions of the bag, power operated mechanism for imparting said movements to the intucking members and the creasing members in definite timed relationship, and means for adhering said closure flaps to said intucked portions and to each other to seal the bag.

26. In a machine for closing and sealing filled bags, a frame structure, means carried by said frame structure and supporting a filled bag to be closed, a supporting platform on said frame overlying said bag supporting means, a pair of opposed intucking members each engageable with an opposite side of the top portion of the bag, means on said platform mounting and guiding the intucking members for relative movements toward and away from each other, a pair of opposed creasing members engageable with the upper end portions of the front and rear walls of the bag and cooperating with the intucking members to form the upper end portions of said front and rear walls into top closure flaps adapted to overlie the intucked portions, means on said platform mounting said creasing members for movements about circuitous paths during which movements wiping engagement is made between the creasing members and the upper portions of the bag, power operated mechanism for imparting said movements to the intucking members and the creasing members in definite timed relationship, and mechanism for raising and lowering said platform, whereby the intucking and creasing members may be positioned to form top closures on bags of various heights.

27. In a machine for closing and sealing filled bags, bag supporting means including a tray and a pair of laterally spaced front and rear bag wall engaging arms upwardly spaced from the tray, and mechanism for feeding the bags to said tray, said mechanism comprising a delivery conveyor, a bag receiver and former at the delivery end of said conveyor, said receiver including a pair of opposed forming plates relatively movable from inoperative positions at opposite sides of the path of travel of the bags to operative bag wall engaging positions, whereby to flatten the front and rear walls of the bag and reduce the thickness of the filled bag to an extent which will permit the bag to be inserted between the front and rear wall engaging arms on the bag supporting means, power operated mechanism for imparting bag wall flattening movements to one of said forming plates relative to the other thereof, and means for transferring the bag from the receiver to the bag supporting means.

28. In a machine for closing and sealing filled bags, a frame structure, mechanism carried by the frame structure for intucking and forming opposite sides of the top portion of a bag to provide closure flaps and for adhering the closure flaps together and to the intucked portions to seal the bag, means carried by the frame structure for supporting the bag during the closing and sealing thereof and including a tray and a pair of laterally spaced front and rear wall engaging arms upwardly spaced from the tray, and mechanism for feeding the filled bags to said tray, the last said mechanism comprising a delivery conveyor, a bag receiver and former at the delivery end of the conveyor, said receiver including a pair of opposed forming plates relatively movable from inoperative positions at opposite sides of the path of travel of the bags to operative bag wall engaging positions, whereby to flatten the front and rear walls of the bag and reduce the thickness of the filled bag to an extent which will permit the bag to be inserted between the front and rear wall engaging arms on the bag supporting means, power operated mechanism for imparting bag wall flattening movements to one of said forming plates relative to the other thereof, and means for transferring the bag from the receiver to the bag supporting means.

29. In a machine for closing and sealing filled bags, a frame structure, mechanism carried by the frame structure for intucking and forming opposite sides of the top portion of a bag to provide closure flaps and for adhering the closure flaps together and to the intucked portions to seal the bag, means carried by the frame structure for supporting the bag during the closing and sealing thereof and including a tray and a pair of laterally spaced front and rear wall engaging arms upwardly spaced from the tray, and mechanism for feeding the filled bags to said tray, the last said mechanism comprising a delivery conveyor, a bag receiver and former at the delivery end of the conveyor, said receiver including a pair of opposed forming plates, means mounting the forming plates for relative movements between inoperative positions at opposite sides of the path of travel of the bags and operative bag wall engaging positions, whereby to flatten the front and rear walls of each of said bags and reduce the thickness of each filled bag to an extent which will permit the bag to be inserted between the front and rear wall engaging arms on the bag supporting means, power operated mechanism for imparting bag wall flattening movements to one of said forming plates relative to the other thereof, and means for transferring the bags from the receiver to the bag supporting means.

30. In the structure defined in claim 27 in which the forming plate mounting means comprises a pair of levers pivotally mounted intermediate their ends on the frame structure for pivotal movements about spaced parallel axes, said plates being pivotally secured one each to the adjacent end of each of said levers for limited swinging movements relative thereto.

31. In a machine for closing and sealing filled bags, a frame structure, mechanism carried by the frame structure for intucking and forming opposite sides of the top portion of a bag to provide closure flaps and for adhering the closure flaps together and to the intucked portions to seal the bag, means carried by the frame structure for supporting the bag during the closing and sealing thereof and including a tray and a pair of laterally spaced front and rear wall engaging arms upwardly spaced from the tray, and mechanism for feeding the filled bags to said tray, the last said mechanism comprising a delivery conveyor, a bag receiver and former at the delivery end of the conveyor, said receiver including a pair of opposed forming plates one each disposed on an opposite side of the path of travel of the bags, a pair of upstanding levers pivotally secured intermediate their ends to said frame structure for swinging movements with respect thereto, said forming plates being pivotally secured one each to the upper end of each of said levers for swinging movements relative thereto, stop means limiting the extent of swinging movement of each of said forming plates with respect to its cooperating lever, power operated mechanism at the lower end of one of said levers for imparting swinging movements thereto, and a motion transfer connection between said levers for imparting swinging movements to one thereof in one direction responsive to power operated mechanism imparting swinging movements of the other thereof in the opposite direction, the swinging movements of said levers imparting relative movements to said forming plates between their normal inoperative positions on opposite sides of the path of travel of the bags and operative bag wall engaging positions, whereby to flatten the front and rear walls of the bags and reduce the thickness of the filled bags to an extent which will permit the bags to be inserted between the front and rear wall engaging arms on the bag supporting means, and means for transferring the bags from the receiver to the bag supporting means.

32. In a machine for closing and sealing filled bags, bag supporting means adapted to receive a filled bag and carry the same to successive stations, and mechanism for feeding bags singly to said supporting means, said mechanism comprising a conveyor, a receiver at the delivery end of said conveyor, said receiver including a bag bottom supporting element and a pair of laterally spaced front and rear bag wall engaging plate-like members movable between normal inoperative positions at opposite sides of the path of travel of a bag into said receiver and bag wall engaging positions against the front and rear walls of said bag, power operated mechanism for imparting said movements to said members, means mounting said bag bottom supporting element and said plate-like members for bag transporting movements transversely of said conveyor into and out of registration with said bag supporting means, and power operated mechanism including a bag engaging transfer head for moving the bag from said members and element onto the bag supporting means when said members and element are in registration with the bag supporting means.

33. In a machine for closing and sealing filled bags, bag supporting means including a tray and a pair of laterally spaced front and rear bag wall engaging arms upwardly spaced from the tray, and mechanism for feeding bags singly to said supporting means, said mechanism comprising a delivery conveyor, a bag receiver and former at the delivery end of said conveyor, said receiver including a pair of opposed generally vertical forming plates and a pair of opposed generally vertical front and rear bag wall engaging plate-like members in tandem relationship to said forming plates in the direction of delivery movement of said bags, said receiver further including a horizontal bag bottom supporting element disposed between the planes of said members, means mounting said forming plates for relative movements between inoperative positions at opposite sides of the path of travel of the bags and operative bag wall engaging positions, whereby to flatten the front and rear walls of each of said bags and reduce the thickness of each filled bag to an extent which will permit the bag to be inserted between the front and rear wall engaging arms of the bag supporting arms, means mounting said plate-like members for relative movements between inoperative positions at opposite sides of the path of travel of the bags and bag wall engaging positions against the flattened front and rear walls of said bag, means mounting said bag bottom supporting element and said plate-like members for bag transporting movements transversely of said conveyor into and out of registration with said bag supporting means, and power operated mechanism including a bag engaging reciprocatory transfer head for moving the bag from said members and element onto the bag supporting means when said members and element are in registration with the bag supporting means.

34. In a machine for closing and sealing filled bags, bag supporting means including a tray adapted to receive a filled bag and carry the same to successive stations for closing and sealing of the bag, mechanism for feeding bags singly to said supporting means, said mechanism comprising a conveyor, a receiver at the delivery end of said conveyor, said receiver including a bag bottom supporting element and a pair of laterally spaced front and rear bag wall engaging plate-like members movable between normal inoperative positions at opposite sides of the path of travel of a bag into said receiver and bag wall engaging positions against the front and rear walls of said bag, power operated mechanism for imparting said movements to said members, means mounting said bag bottom supporting elements and said plate-like members for bag transporting movements transversely of said conveyor into and out of registration with said supporting means, mechanism including a bag engaging transfer head for moving the bag from said members and element onto the bag supporting means when said bag members and element are in registration with the bag supporting means, power operated mechanism for imparting movements to said bag supporting means toward said stations, and control mechanism for said last-mentioned power operated mechanism, said control mechanism including an actuator operatively engageable by the transfer head when said head approaches its limit of bag transferring movement toward the bag supporting means to initate movement of said bag supporting means.

35. In a machine for closing and sealing filled bags, a supporting structure, means carried by the supporting structure and including a bag supporting element for receiving and transporting a filled bag, mechanism carried by the supporting structure for intucking opposite sides of the open upper end portion of the bag and forming said upper end into closure flaps adapted to overlie the intucked portions, means for applying adhesive to one of said closure flaps, said last-mentioned means including a paste applicator roller, means for supplying paste to said applicator roller, a deflector engageable with one of said closure flaps to move the same downwardly into bag closing engagement with said intucked portions as the bag approaches said roller, a sweep mounted for swinging movements toward and away from said applicator roller and engageable with the other of said closure flaps to move the same into paste receiving engagement with said applicator roller, power operated mechanism for conveying the bag away from the bag supporting element, and means for guiding said other closure flap into sealing engagement with said one closure flap and said intucked portions of the bag.

36. The structure defined in claim 35 in which the means for guiding said other closure flap into sealing engagement with said one closure flap includes an elongated guide element sloping downwardly toward the bag and in the direction of movement of the bag away from said bag supporting element.

37. The structure defined in claim 35 in which the means for guiding said other closure flap into sealing engagement with said one closure flap includes an elongated guide element sloping downwardly toward the bag and in the direction of movement of the bag away from said bag supporting element, and in further combination with means mounting the guide element for movements transversely of said direction of movement of the bag, and power operated mechanism for imparting said movements to the guide element.

38. In a machine for closing and sealing filled bags, a supporting structure, means carried by the supporting structure and including a bag supporting element for receiving and transporting a filled bag, mechanism carried by the supporting structure for intucking the opposite sides of the open upper end portion of the bag and forming said upper end into closure flaps adapted to overlie the intucked portions, means for applying adhesive to one of said closure flaps, said last-mentioned means including a paste applicator roller journalled in the supporting structure for rotary movements on a horizontal axis and disposed in the path of travel of the upper end portion of the bag, means for supplying paste to said applicator roller, a deflector mounted on said supporting structure below and slightly forwardly of said roller and engageable with one of said closure flaps to move the same downwardly into bag closing engagement with said intucked portions as the bag approaches said roller, a sweep mounted for swinging movements toward and away from said applicator roller and engageable with the other of said closure flaps to move the same into paste receiving engagement with said applicator roller, power operated mechanism for conveying the bag away from the bag supporting element, and means for guiding said other closure flap into sealing engagement with said one closure flap and the intucked portions of the bag during movements of the bag away from said supporting element.

39. In a machine for closing and sealing filled bags, a supporting structure, means carried by the supporting structure and including a bag supporting element for receiving and transporting a filled bag, mechanism carried by the supporting structure for intucking the opposite sides of the open upper end portion of the bag and forming said upper end into closure flaps adapted to overlie the intucked portions, means for applying adhesive to one of said closure flaps, said last-mentioned means including a paste applicator roller journalled in the supporting structure for rotary movements on a horizontal axis and disposed in the path of travel of the upper end portion of the bag, means for supplying paste to said applicator roller, a deflector mounted on said supporting structure below and slightly forwardly of said roller and engageable with one of said closure flaps to move the same downwardly into bag closing engagement with said intucked portions as the bag approaches said roller, a sweep extending generally parallel to the axis of the applicator roller, means mounting said sweep for swinging movements between an inoperative position forwardly of the roller above the level of the top of the bag and an operative position wherein the other of said closure flaps is pressed between the sweep and the applicator roller, power operated mechanism for conveying the bag away from the bag supporting element, and means for guiding said other closure flap into sealing engagement with said one closure flap and the intucked portion of the bag during movement of the bag away from the bag supporting element.

40. The structure defined in claim 39 in which the sweep mounting means comprises a shaft mounted in the supporting structure and a lever mounted on the shaft, said sweep being carried by one end of said lever, and in further combination with yielding means biasing the lever in a direction to move the sweep toward its operative bag engaging positions, and power operated mechanism for swinging the lever in a direction to move said sweep toward its inoperative position against the bias exerted by the yielding means.

41. In a machine for closing and sealing filled bags, a supporting structure, a bag supporting element carried by said structure for receiving and transporting a filled bag, mechanism carried by the supporting structure for intucking the opposite sides of the open upper end portion of the bag and forming said upper end portion into closure flaps adapted to overlie the intucked portions, means for applying adhesive to one of said closure flaps, said means including a paste applicator journalled in said structure for rotation on a horizontal axis and disposed in the path of travel of the upper end portion of the bag, a deflector engageable with one of the closure flaps to move the same into bag closing engagement with said intucked portions as the bag approaches said roller, a sweep mounted for swinging movements toward and away from said applicator roller and engageable with the other of said closure flaps to move the same into paste receiving engagement with said roller, power operated mechanism for imparting said swinging movements to said sweep and including a power driven cam mounted on the supporting structure and connections including an abutment and a cam follower operatively associated with said sweep, yielding means biasing said sweep in a direction toward engagement with said other closure flap and biasing said cam follower in the direction of said cam, and control means for said power operated mechanism, said control means comprising a movable member positioned to intercept and be moved by said bag when the bag approaches said roller, a stop lug mounted on the supporting structure for movements into and out of engagement with said abutment, and motion transfer connections between said movable member and said stop lug, and yielding means biasing said movable member toward its bag intercepting position and said stop lug toward engagement with said abutment, said stop lug being movable out of engagement with said abutment responsive to bag imparted movements of said movable member, whereby to permit said sweep to operatively engage said other closure flap.

References Cited in the file of this patent

UNITED STATES PATENTS

| | | |
|---|---|---|
| 1,058,579 | Gwinn | Apr. 8, 1913 |
| 1,563,715 | Boulanger | Dec. 1, 1925 |
| 1,989,471 | Belcher | Jan. 29, 1935 |

FOREIGN PATENTS

| | | |
|---|---|---|
| 580,273 | Germany | July 12, 1933 |